US006982311B2

(12) United States Patent
Karande et al.

(10) Patent No.: US 6,982,311 B2
(45) Date of Patent: *Jan. 3, 2006

(54) FILMS PRODUCED FROM SUBSTANTIALLY LINEAR HOMOGENEOUS OLEFIN POLYMER COMPOSITIONS

(75) Inventors: Seema V. Karande, Pearland, TX (US); Lonnie G. Hazlitt, Lake Jackson, TX (US); Pradeep Jain, Lake Jackson, TX (US); Kaelyn Koch, Lake Jackson, TX (US); Shih-Yaw Lai, Singapore (SG); Li-Min Tau, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/210,139

(22) Filed: Jul. 31, 2002

(65) Prior Publication Data

US 2003/0022998 A1 Jan. 30, 2003

Related U.S. Application Data

(63) Continuation of application No. 09/485,801, filed as application No. PCT/US98/14304 on Jul. 10, 1998, now Pat. No. 6,486,284.
(60) Provisional application No. 60/055,902, filed on Aug. 15, 1997.

(51) Int. Cl.
*C08F 210/16* (2006.01)

(52) U.S. Cl. .................... 526/348.1; 526/348; 428/339; 428/98; 428/220; 264/454; 264/457; 264/458; 264/564; 525/240

(58) Field of Classification Search ............... 526/348, 526/348.1; 428/339, 220, 98; 264/454, 457, 264/458, 564; 525/240
See application file for complete search history.

(56) References Cited

U.S. PATENT DOCUMENTS

| | | | |
|---|---|---|---|
| 3,914,342 A | 10/1975 | Mitchell | |
| 4,205,021 A | 5/1980 | Morita et al. | |
| 4,429,079 A | 1/1984 | Shibata et al. | |
| 4,454,272 A | 6/1984 | McKinney et al. | |
| 4,597,920 A | 7/1986 | Golike | |
| 4,668,752 A | 5/1987 | Tominari et al. | |
| 4,798,081 A | 1/1989 | Hazlitt et al. | |
| 5,055,438 A | 10/1991 | Canich et al. | |
| 5,057,475 A | 10/1991 | Canich et al. | |
| 5,064,802 A | 11/1991 | Stevens et al. | |
| 5,132,380 A | 7/1992 | Stevens et al. | |
| 5,153,157 A | 10/1992 | Hlatky et al. | |
| 5,231,106 A | 7/1993 | Knutsen et al. | |
| 5,272,236 A | 12/1993 | Lai et al. | |
| 5,278,272 A | 1/1994 | Lai et al. | |
| 5,296,433 A | 3/1994 | Siedle et al. | |
| 5,371,146 A | 12/1994 | Takahashi et al. | |
| 5,374,696 A | 12/1994 | Rosen et al. | |

(Continued)

FOREIGN PATENT DOCUMENTS

| | | |
|---|---|---|
| EP | 0 277 003 A1 | 8/1988 |
| EP | 0 416 815 A2 | 3/1991 |
| EP | 0 468 651 B1 | 1/1992 |
| EP | 0514 828 B1 | 11/1992 |
| EP | 0 520 732 B1 | 12/1992 |
| EP | 0527 221 B1 | 2/1993 |
| EP | 0 619 827 B1 | 10/1994 |
| EP | 0773 257 A2 | 5/1997 |
| WO | WO 93/13143 * | 7/1993 |
| WO | WO 94/17112 | 8/1994 |
| WO | WO 95/00683 | 1/1995 |
| WO | WO 95/21743 | 5/1995 |
| WO | WO 96/28480 | 9/1996 |
| WO | WO 97/35893 | 10/1997 |
| WO | WO 98/26000 | 6/1998 |
| WO | WO 99/03902 | 1/1999 |
| WO | WO 99/14271 | 3/1999 |

OTHER PUBLICATIONS

Wild et al., Journal of Polymer Science, Poly. Phys. Ed., vol. 20, 1983, pp. 441–445.
M. Shida et al., Polymer Engineering Science, vol. 17, No. 11, 1977, pp. 769–773.
J. Dealy, "Rheometers for Molten Plastics," 1982, pp. 97–99.
Ramamurthy, Journal of Rheology, 30(2), 1986, pp. 337–357.
S. Lai and G.W. Knight, ANTEC '93 Proceedings, INSITE™ Technology Polyolefins (SLEP)—New Rules in the Structure/Rheology Relationship of Ethylene α–Olefin Copolymers, New Orleans, LA, May 1993.
Randall, Rev. Macromol. Chem. Phys., C29 (2&3), pp. 285–297.
G.H. Zimm and W.H. Stockmayer, Journal of Chemical Physics, vol. 17, No. 12, 1949, p. 1301–1314.
Rudin, "Measurement of Long–Chain Branch Frequency in Synthetic Polymers," Modern Methods of Polymer Characterization, 1991, pp. 103–112.
S. Krimm, et al., *Chemical Society (Great Britain)*, Faraday discussions of the Chemical Society, vol. 68, 1979, p. 244.
P.H. Geit, Polymer Single Crystals, 1963, pp 50–52, 232–261.
P.J. Flory, Journal of the American Chemical Society, vol. 84, 1962, p. 2837–2838.

*Primary Examiner*—Roberto Rabago

(57) ABSTRACT

The subject invention provides a film having at least one layer comprising an interpolymer of ethylene and at least on comonomer selected from the group consisting of $C_3$–$C_{20}$ α-olefins, dienes, and cycloalkenes, wherein the interpolymer is characterized as having a high degree of processability, good optical performance, and good mechanical properties. The subject invention further provides film fabrication processes and polymer compositions which are useful in preparing the subject films.

32 Claims, 3 Drawing Sheets

U.S. PATENT DOCUMENTS

Figure 1:
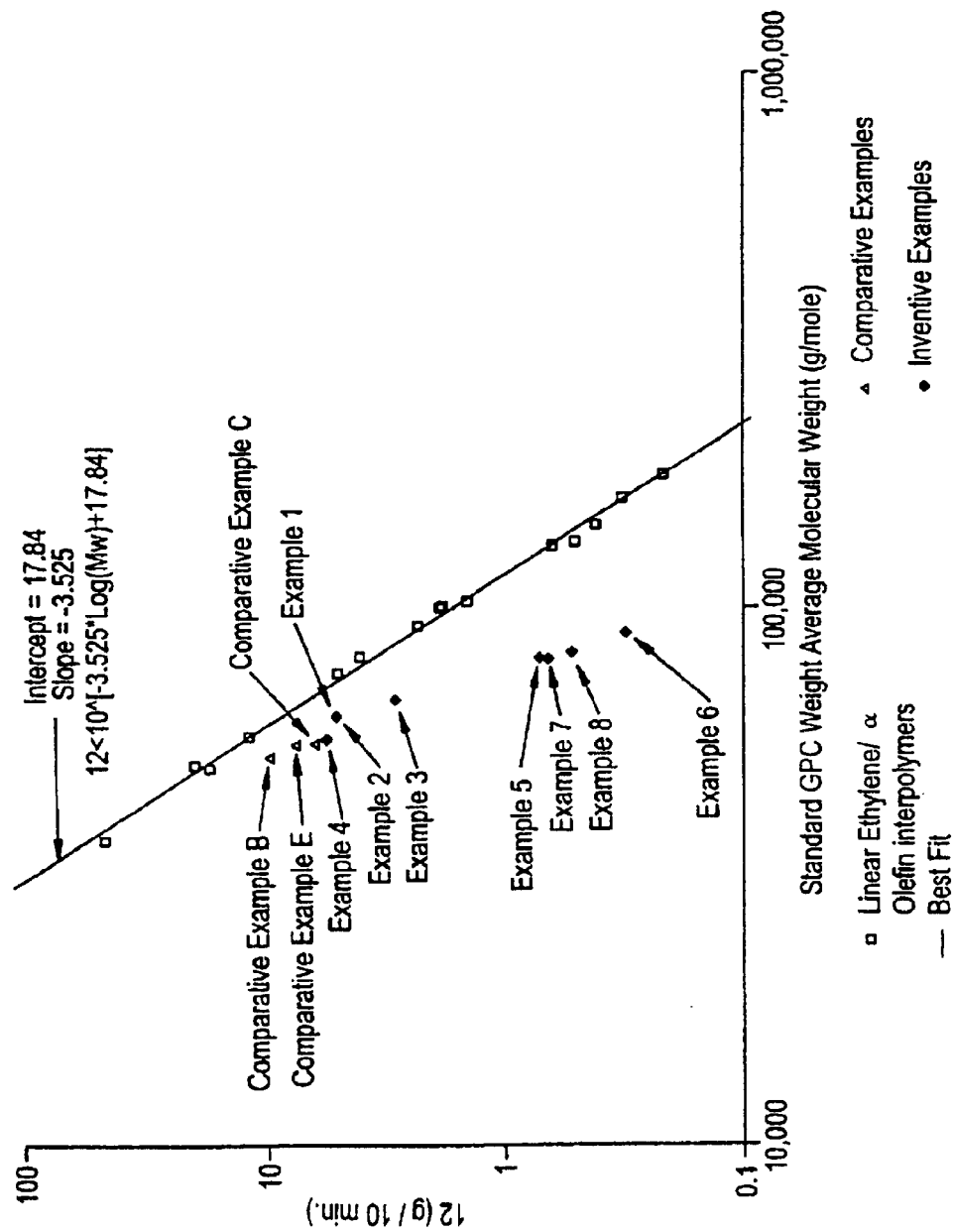

| | | |
|---|---|---|
| 5,382,630 A | 1/1995 | Stehling et al. |
| 5,382,631 A | 1/1995 | Stehling et al. |
| 5,420,220 A | 5/1995 | Cheruvu et al. |
| 5,453,410 A | 9/1995 | Kolthammer et al. |
| 5,470,993 A | 11/1995 | Devore et al. |
| 5,539,076 A | 7/1996 | Nowlin et al. |
| 5,783,638 A * | 7/1998 | Lai et al. .................... 525/240 |
| 6,486,284 B1 * | 11/2002 | Karande et al. ......... 526/348.1 |

* cited by examiner

FILMS PRODUCED FROM SUBSTANTIALLY LINEAR HOMOGENEOUS OLEFIN POLYMER COMPOSITIONS

This is a continuation, of prior application Ser. No. 09/485,801, filed May 8, 2000, now U.S. Pat. No. 6,486,284, which is a National Phase Filing under 35 USC 371 of PCT/US98/14304, filed Jul. 10, 1998, which claims priority to U.S. Ser. No. 60/055,902, filed Aug. 15, 1997, which is hereby incorporated herein by reference in its entirety.

The subject invention pertains to ethylene polymer compositions which are useful in film applications. In particular, the subject invention pertains to ethylene polymer compositions which exhibit the processability of highly branched low density polyethylene, while exhibiting improved mechanical properties, and to films prepared therefrom.

Historically speaking, highly branched low density polyethylene has found great utility in blown film applications, attributable in part to its unique processability. Large amounts of long chain branching and a broad molecular weight distribution give this polymer the shear thinning and melt strength properties unmatched by heterogeneously branched linear low density polyethylene resins. Non-Newtonian shear thinning provides the high shear, low melt viscosity for good extruder processability and low shear, high melt viscosity for superior blow film bubble stability.

Low density polyethylene has found utility in a variety of film applications. Markets which require a combination of high processability resins, but do not require high film clarity, include industrial liners, heavy duty shipping sacks, non-clarity rack and counter bags, mulch film, and rubber separators. Markets which require a combination of high processability resins and high clarity films include clarity liners, bakery films, shrink films, and garment bags.

The performance requirements vary depending upon the application, but include elements of (1) the polymer "extrudability" (high shear rheology) and melt strength (low shear rheology); (2) mechanical properties of the fabricated article; and (3) optical properties of the fabricated article. The actual performance requirements are given in terms of (1) the film bubble stability, polymer output rate (kg/hr) and extruder performance (pressure, melt temperature and motor amperes); (2) strength of the fabricated article (such as tensiles, resistance to tear, resistance to puncture); and (3) clarity, haze and gloss of the fabricated article.

Heterogeneously branched ethylene/α-olefin interpolymers, which are referred to in industry as linear low density polyethylene (LLDPE), have likewise found utility in blown film applications. In many respects, such resins are preferred to low density polyethylene, as they lead to blown films exhibiting tear and toughness properties. However, such polymers are more difficult to process and have decreased optical properties, such as haze and clarity, than films prepared with highly branched low density polyethylene.

In developing markets, demand for polyolefins which exhibit the processability of low density polyethylene is growing. However, the demand is currently outpacing the investment in new low density polyethylene plants. The industry would find advantage in olefin polymer compositions which are useful to prepare blown films which have toughness and impact properties comparable to heterogeneously branched ethylene/alpha-olefin interpolymers, which exhibit the processability and optical properties of highly branched low density polyethylene. Preferably, such polymer compositions would be produced in low pressure solution, slurry, or gas phase polymerization reactions.

U.S. Pat. No. 5,539,076 discloses a particulate polymer composition which is an in situ catalytically produced blend having a broad bimodal molecular weight distribution. Molecular weight distributions of 2.5 to 60 are broadly claimed, with molecular weight distributions of 10 to 50 being preferred, and of 15 to 30 being most preferred.

U.S. Pat. No. 5,420,220 discloses a film comprising a metallocene-catalyzed ethylene polymer having a density of from 0.900 to 0.929 g/cm$^3$, an $I_{21}/I_2$ of 15 to 25, an $M_w/M_n$ of from 2.5 to 3.0, and a melting point ranging from 95° C. to 135° C. A polymer having an $I_{21}/I_2$ of 18 and an $M_w/M_n$ of 2.6 is exemplified.

U.S. Pat. No. 4,205,021 discloses a copolymer of ethylene and a $C_5$–$C_{18}$ α-olefin, which copolymer has a density of from 0.90 to 0.94 g/cm$^3$. The disclosed compositions are said to have long chain branching, and are described as preferably having two or more DSC melting points. U.S. Pat. No. 4,205,021 discloses the use of the disclosed polymers in blown films.

U.S. Ser. No. 08/858,664, now U.S. Pat. No. 6,538,070, (PCT Publication WO 93/13,143), discloses the in-situ preparation of a blend of two ethylene polymers prepared with a constrained geometry catalyst, wherein each of the polymers is said to have a melt index ($I_2$) of from 0.05 to 50 g/10 minutes. The polymers may be prepared in a single reactor with two active catalyst species, or may be produced in a dual reactor configuration with either the same or different constrained geometry catalysts being provided in each reactor.

The industry would find advantage in olefin polymer compositions which will usefully replace high pressure low density polyethylene, without requiring film fabricators to engage in significant reconstruction and retrofitting of their fabrication lines. The desired olefin polymer compositions should have processability and optical properties which are at least roughly equivalent to that of highly branched low density polyethylene. Preferably, the desired olefin polymer compositions will further exhibit toughness and impact properties which are improved over the properties of low density polyethylene. Preferably, such polymer compositions will be produced in low pressure solution, slurry, or gas phase polymerization reactions.

Accordingly, the subject invention provides a film having at least one layer comprising an interpolymer of ethylene and at least one comonomer selected from the group consisting of $C_3$–$C_{20}$ α-olefins, dienes, and cycloalkenes, wherein the interpolymer is characterized as having:

a. a density of from 0.910 to 0.930 g/cm$^3$,
  b. a melt index ($I_2$) of from 0.2 to 10 g/10 minutes,
  c. an $I_{10}/I_2$ of from 9 to 20, and
  d. a molecular weight distribution, $M_w/M_n$ of from 2.1 to 5.

In an especially preferred embodiment, such a polymer will further have from one to two crystallization peaks as determined by TREF, each occurring between 45° C. and 98° C., with each having a CTBI of less than 18° C.

In one preferred embodiment, the interpolymer will have an $I_2$ of from 1.0 to 7 g/10 minutes. In a more preferred embodiment, the interpolymer will be prepared in two polymerization reactors, each of which contains a single site constrained geometry or metallocene catalyst. In such a more preferred embodiment, the interpolymer, upon fractionation by gel permeation chromatography, will most preferably be characterized as comprising:

a. from 25 to 90 percent of a first polymer fraction having a melt index ($I_2$) of from 0.05 to 1.0 g/10 minutes, and a single crystallization peak between 45° C. and 98° C. having a CTBI value of less than 18° C. as determined by TREF; and b. from 10 to 75 percent of a second polymer fraction having a melt index ($I_2$) of at least 30 g/10 minutes, and a single crystallization peak between 45° C. and 98° C. having a CTBI value of less than 18° C. as determined by TREF.

In another preferred embodiment, the polymer will have an $I_2$ of from 0.05 to less than 2.5 g/10 minutes, an $I_{10}/I_2$ of at least 12.5, and an $M_w/M_n$ of from 2.1 to 3.0. In this alternate preferred embodiment, the polymer will most preferably be characterized as having a single crystallization peak between 45° C. and 98° C. having a CTBI of less than 18° C. as determined by TREF.

The subject invention further provides a process for preparing a blown film comprising:

a. melting an interpolymer to a temperature of 300 to 350° F. (149 to 177° C.), b. extruding the interpolymer at the rate of 15 to 50 lb/hr (6.8 to 23 kg/hr) through a die having a 40 to 80 mil (1 to 2 mm) die gap, c. blowing the film to into a bubble, at a blow-up-ratio of 1.3 to 2, to form a 0.5 to 4 mil (0.01 to 0.1 mm) gauge film, and d. cooling the film by means external to the bubble, wherein the interpolymer is an interpolymer of ethylene and at least one comonomer selected from the group consisting of $C_3$–$C_{20}$ α-olefins, dienes, and cycloalkenes is characterized as having:

i. a density of from 0.910 to 0.930 g/cm³,
ii. a melt index ($I_2$) of from 0.2 to 10 g/10 minutes,
iii. an $I_{10}/I_2$ of from 9 to 20, and
iv. a molecular weight distribution, $M_w/M_n$ of from 2.1 to 5.

In an especially preferred process, the interpolymer employed will have from one to two crystallization peaks between 45° C. and 98° C., each having a CTBI of less than 18° C., as determined by TREF.

The subject invention further provides a process for preparing a blown film comprising:

a. melting an interpolymer to a temperature of 300 to 400° F. (149 to 204° C.), b. extruding the interpolymer at the rate of 15 to 50 lb/hr (6.8 to 23 kg/hr) through a die having a 40 to 80 mil (1 to 2 mm) die gap, c. blowing the film to into a bubble, at a blow-up-ratio of 2 to 4, to form a 2 to 5 mil (0.05 to 0.13 mm) gauge film, and d. cooling the film by means external to the bubble, wherein the interpolymer is an interpolymer of ethylene and at least one comonomer selected from the group consisting of $C_3$–$C_{20}$ α-olefins, dienes, and cycloalkenes is characterized as having:

i. a density of from 0.910 to 0.930 g/cm³,
ii. a melt index ($I_2$) of from 0.05 to 2.5 g/10 minutes,
iii. an $I_{10}/I_2$ of from 12.5 to 20, and
iv. a molecular weight distribution, $M_w/M_n$ of from 2.1 to 3.

In an especially preferred process, the interpolymer employed will have from one to two crystallization peaks between 45° C. and 98° C., each having a CTBI of less than 18° C., as determined by TREF.

The subject invention further provides a polymer composition consisting essentially of an interpolymer of ethylene and at least one comonomer selected from the group consisting of $C_3$–$C_{20}$ α-olefins, dienes, and cycloalkenes, wherein the interpolymer is characterized as having:

a. a density of from 0.910 to 0.930 g/cm³,
b. a melt index ($I_2$) of from 0.2 to 10 g/10 minutes,
c. an $I_{10}/I_2$ of from 9 to 20,
d. a molecular weight distribution, $M_w/M_n$, of from 2.1 to 5,
e. a molecular weight distribution, $M_w/M_n$ as determined by gel permeation chromatography and defined by the equation:

$$(M_w/M_n) < (I_{10}/I_2) - 4.63, \text{ and}$$

f. a gas extrusion rheology such that the critical shear rate at onset of surface melt fracture for the interpolymer is at least 50 percent greater than the critical shear rate at the onset of surface melt fracture for a linear ethylene polymer, wherein the interpolymer and the linear ethylene polymer comprise the same comonomer or comonomers, wherein the linear ethylene polymer has an $I_2$, $M_w/M_n$ and density within ten percent of the interpolymer, and wherein the respective critical shear rates of the interpolymer and the linear ethylene polymer are measured at the same melt temperature using a gas extrusion rheometer.

In an especially preferred embodiment, the subject polymer composition will be characterized as having from one to two crystallization peaks between 45° C. and 98° C., each having a CTBI of less than 18° C., as determined by TREF.

Figure 2:
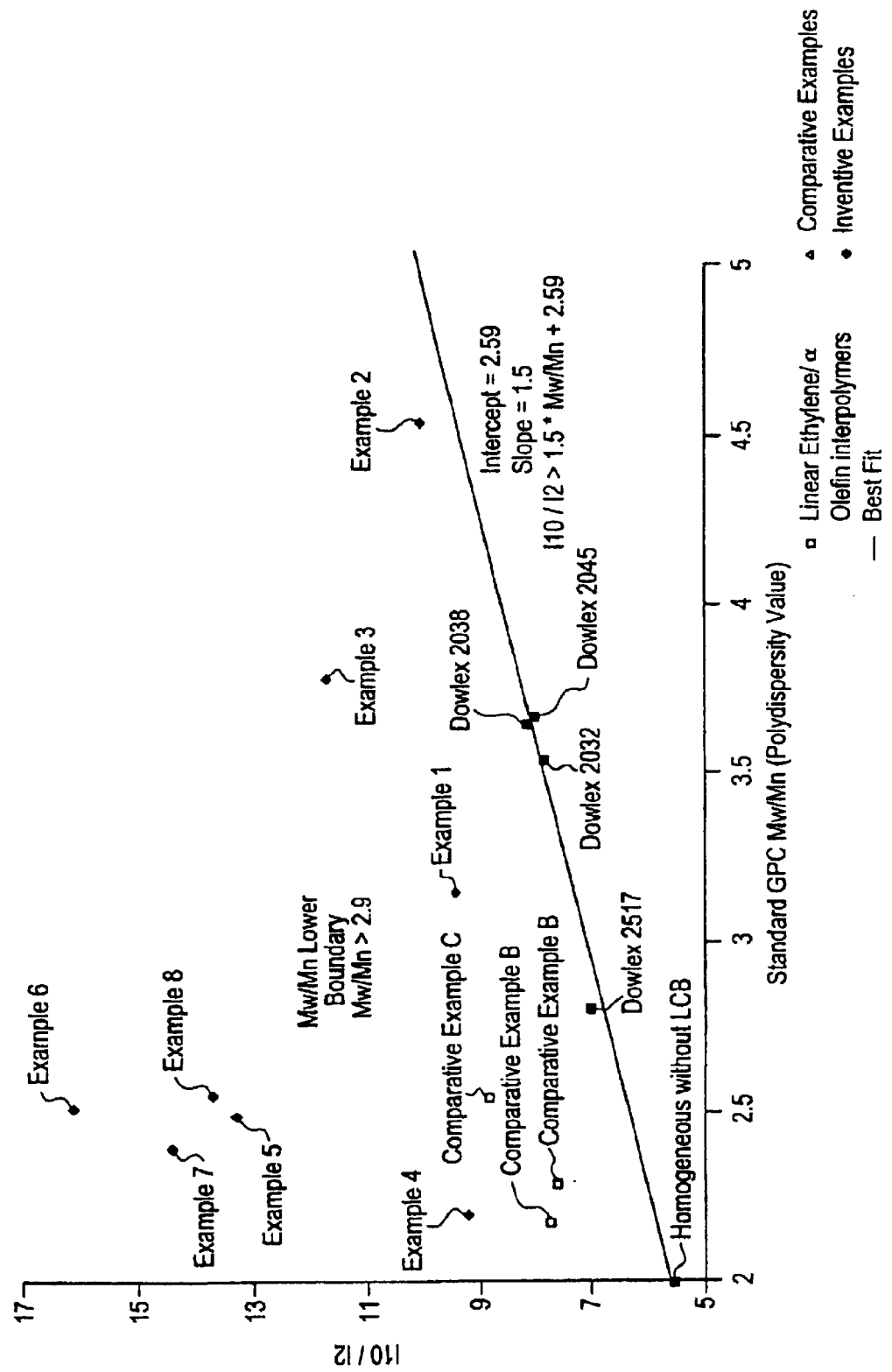
Figure 3:
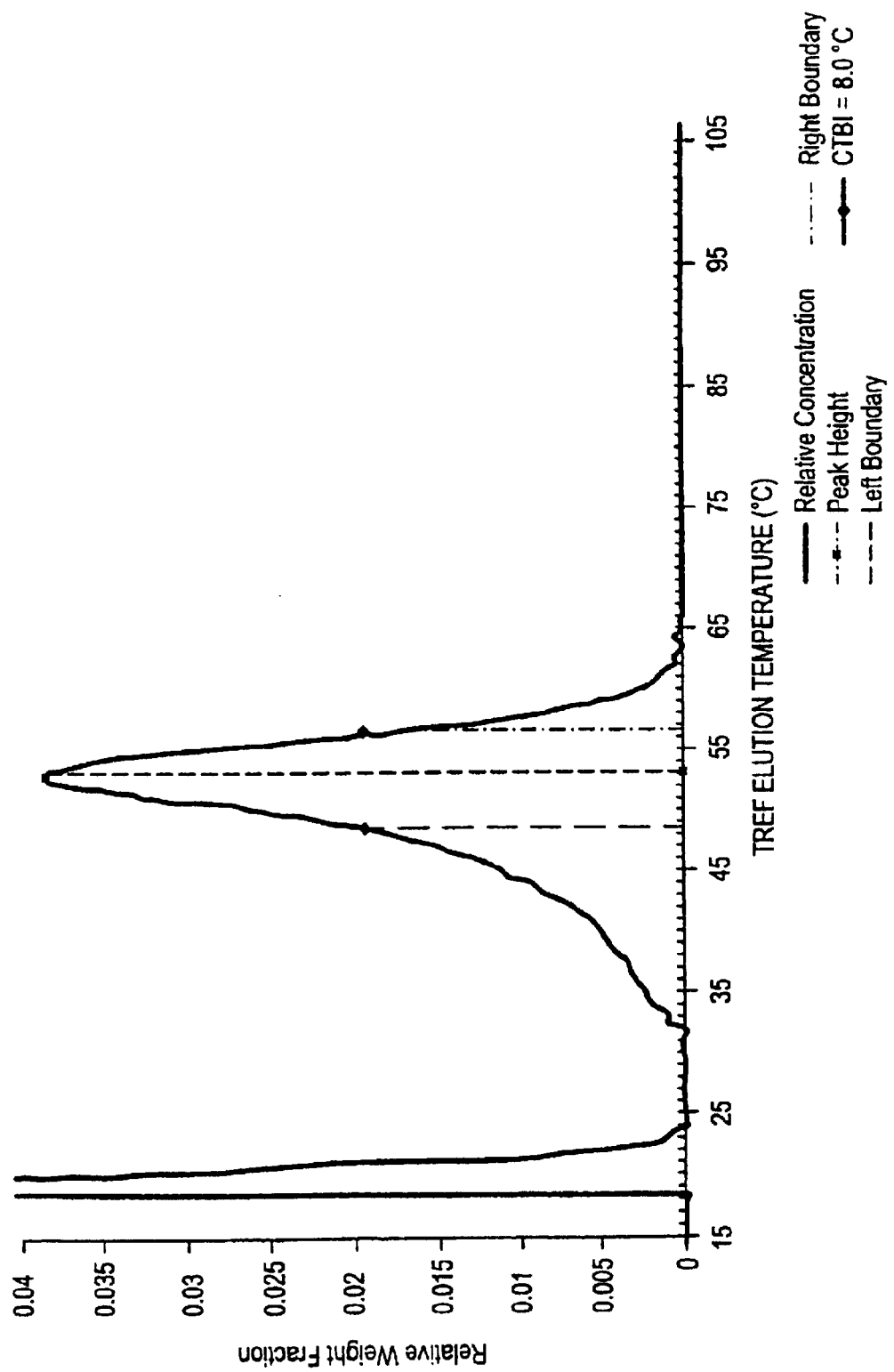

These and other embodiments are more fully described in the following detailed description, wherein:

FIG. 1 is a plot of the $M_w$ versus melt index ($I_2$) for polymers of the Examples and Comparative Examples, FIG. 2 is a plot of the $M_w/M_n$ versus $I_{10}/I_2$ for polymers of the Examples and Comparative Examples, and FIG. 3 is a diagrammatic representation of the calculation of Crystallization Temperature Breadth Index, CTBI, for a general crystallization peak occurring in a Temperature Rising Elution Fractionation, TREF, analysis.

TEST METHODS

Unless otherwise indicated, the following procedures are employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

$I_{10}$, is measured in accordance with ASTM D-1238, Condition 190° C./10 kg (formerly known as "Condition N").

Molecular weight is determined using gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.14 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968) to derive the following equation:

$$M_{polyethylene} = a^*(M_{polystyrene})b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melting temperature, crystallization temperature, and percent crystallinity are determined using differential scanning calorimetry (DSC). Differential scanning calorimetry (DSC) data was generated by placing each sample (5 mg) in an aluminum pan, the sample was heated to 160° C., cooled at 10° C./min and the endotherm was recorded by scanning from −30° C. to 140° C. at 10° C./min using a Perkin Elmer DSC 7. The DSC exotherm (cooling curve) was also recorded by scanning from 140 to −30 at 10° C./min.

Percent crystallinity is calculated with the equation:

$$\% C = (A/292 \text{ J/g}) \times 100,$$

in which % C represents the percent crystallinity and A represents the heat of fusion of the ethylene in Joules per gram (J/g) as determined by differential scanning calorimetry (DSC).

Haze is measured in accordance with ASTM D-1003.

Elmendorf tear is determined in accordance with ASTM D1922.

Tensile strength and toughness are determined in accordance with ASTM D638.

45° gloss is measured in accordance with ASTM D2457.

Dart impact (A, B) is measured in accordance with ASTM D-1709.

Percent elongation is measured in accordance with ASTM D-882.

Clarity is measured in accordance with ASTM D-1746.

The term "interpolymer" is used herein to indicate a copolymer, or a terpolymer, or a higher order polymer. That is, at least one other comonomer is polymerized with ethylene to make the interpolymer.

The ethylene/α-olefin interpolymer used in the films of the present invention is preferably a homogeneous linear or substantially linear ethylene/α-olefin interpolymer. By the term "homogeneous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer which has been prepared in a solution polymerization process has a melting peak greater than 115° C. (such as is the case of polymers having a density greater than 0.940 g/cm³), it does not additionally have a distinct lower temperature melting peak.

In addition or in the alternative, the homogeneity of the constituents of the interpolymer may be described by the Crystallization Temperature Breadth Index, CTBI. CTBI can be measured from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al). An example of how one obtains the CTBI for a given crystallization peak in the TREF experiment is shown in FIG. 3. The calculation is applied only to individual, distinct crystallization peaks in the TREF analysis. The TREF data may be deconvoluted prior to the calculation. The calculation consists of: (1) measuring the height of the crystallizaiton peak in question; then (2) measuring the width of the peak at one-half the height. The value is reported in ° C. The CTBI for the homogeneous ethylene/α-olefin interpolymers useful in the invention is less than 18° C., preferably less than 15° C. A CTBI value of less than 10° C. is attainable.

The homogeneous ethylene interpolymer useful in the practice of the invention will preferably have an $M_w/M_n$ of from 1.5 to 3.5, more preferably from 1.7 to 3.0. It is noted that in the embodiment of the invention which comprises an in-reaction or physical blend of two homogeneous polymers, the overall composition may have an $M_w/M_n$ of greater than 3.5, although the individual components will have an $M_w/M_n$ in the narrower range recited above.

Linear ethylene interpolymers are interpolymers characterized as having an interpolymer backbone substituted with less than 0.01 long chain branches per 1000 carbons. Substantially linear ethylene interpolymers are interpolymers characterized as having an interpolymer backbone substituted with from 0.01 to 3 long chain branches per 1000 carbons. Due to the presence of such long chain branching, substantially linear ethylene interpolymers are further characterized as having a melt flow ratio ($I_{10}/I_2$) which may be varied independently of the polydispersity index, referred to alternatively as the molecular weight distribution or $M_w/M_n$. This feature accords substantially linear ethylene polymers with a high degree of processability despite a narrow molecular weight distribution.

It is noted that the linear and substantially linear interpolymers useful in the invention differ from low density polyethylene prepared in a high pressure process. In one regard, whereas low density polyethylene is an ethylene homopolymer having a density of from 0.915 to 0.935 g/cm³, the homogeneous linear and substantially linear interpolymers useful in the invention require the presence of a comonomer to reduce the density to the range of from 0.900 to 0.935 g/cm³.

The long chain branches of substantially linear ethylene interpolymers have the same comonomer distribution as the interpolymer backbone and can be as long as about the same length as the length of the interpolymer backbone. In the preferred embodiment, wherein a substantially linear ethylene/α-olefin interpolymer is employed in the practice of the invention, such interpolymer will be more preferably be characterized as having an interpolymer backbone substituted with from 0.01 to 3 long chain branches per 1000 carbons.

Methods for determining the amount of long chain branching present, both qualitatively and quantitatively, are known in the art.

For qualitative methods for determining the presence of long chair branching, see, for example, U.S. Pat. Nos. 5,272,236 and 5,278,272. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

The gas extrusion rheometer useful in the determination of Theological processing index (PI), the critical shear rate at the onset of surface melt fracture, and the critical shear stress at the onset of gross melt fracture, is described by M. Shida, R. N. Shroff, and L. V. Cancio in Polymer Engineering Science, Vol. 17, No. 11, p. 770 (1977), and in "Rheometers for Molten Plastics" by John Dealy, published by Van Nostrand Reinhold Co. (1982) on pp. 97–99. GER experiments are performed at a temperature of 190° C., at nitrogen pressures between 250 and 5500 psig (between 1.72 and 37.9 MPa) using a 0.0754 mm diameter, 20:1 L/D die with an entrance angle of 180°.

For substantially linear ethylene interpolymers, the PI is the apparent viscosity (in kpoise) of a material measured by GER at an apparent shear stress of $2.15 \times 10^6$ dynes/cm$^2$ (0.215 MPa). Substantially linear ethylene interpolymers useful in the invention will have a PI in the range of 0.01 kpoise to 50 kpoise, preferably 15 kpoise or less. Substantially linear ethylene interpolymers have a PI which is less than or equal to 70 percent of the PI of a linear ethylene interpolymer (either a Ziegler polymerized polymer or a homogeneous linear ethylene interpolymer) having the same comonomer or comonomers, and having an $I_2$, $M_w/M_n$, and density, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the Journal of Rheology, 30(2), 1986, pages 337–357, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described gas extrusion rheometer, the onset of surface melt fracture is characterized as the beginning of losing extrudate gloss at which the surface roughness of the extrudate can only be detected by magnification at 40 times. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than 0.910 g/cm$^3$, is greater than $4 \times 10^6$ dynes/cm$^2$ (0.4 MPa).

The presence of long chain branching may further be qualitatively determined by the Dow Rheology Index (DRI), which expresses a polymer's "normalized relaxation time as the result of long chair branching." (See, S. Lai and G. W. Knight, ANTEC '93 Proceedings, INSITE™ Technology Polyolefins (SLEP)—New Rules in the Structure/Rheology Relationship of Ethylene α-Olefin Copolymers, New Orleans, La., May 1993. DRI values range from 0 for polymers which do not have any measurable long chain branching, such as Tafmer™ products available from Mitsui Petrochemical Industries and Exact™ products available from Exxon Chemical company) to 15, and are independent of melt index. In general, for low to medium pressure ethylene polymers, particular at lower densities, DRI provides improved correlations to melt elasticity and high shear flowability relative to correlations of the same attempted with melt flow ratios. Substantially linear ethylene interpolymers will have a DRI of preferably at least 0.1, more preferably at least 0.5, and most preferably at least 0.8.

DRI may be calculated from the equation:

$$DRI = (3.652879 * \tau o 1.00649/\eta o - 1)/10$$

where $\tau o$ is the characteristic relaxation time of the interpolymer and $\eta o$ is the zero shear viscosity of the interpolymer. Both $\tau o$ and $\eta o$ are the "best fit" values to the Cross equation:

$$\eta/\eta o = 1/(1+(\gamma^* \tau o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a gas extrusion rheometer (GER) at extrusion pressures from 1,000 to 5,000 psi (6.89 to 34.5 MPa), which corresponds to a shear stress of from 0.086 to 0.43 MPa, using a 0.0754 mm diameter, 20:1 L/D die at 190° C. Specific material determinations may be performed from 140 to 190° C. as required to accommodate melt index variations.

For quantitative methods for determining the presence of long chain branching, see, for example, U.S. Pat. Nos. 5,272,236 and 5,278,272; Randall (Rev. Macromol. Chem. Phys., C29 (2&3), p. 285–297), which discusses the measurement of long chain branching using $^{13}C$ nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pages 103–112, which discuss the use of gel permeation chromatography coupled with a low angle laser light scattering detector (GPC-LALLS) and gel permeation chromatography coupled with a differential viscometer detector (GPC-DV).

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that in substantially linear ethylene polymers, the measured values for long chain branches obtained by this method correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of log($I_2$, melt index) as a function of log(GPC weight average molecular weight), as determined by GPC-DV, illustrates that the long chain branching aspects (but not the extent of long chain branching) of substantially linear ethylene polymers are comparable to those of high pressure, highly branched low density polyethylene (LDPE) and are clearly distinct from heterogeneously branched ethylene polymers produced using Ziegler-type catalysts (such as linear low density polyethylene and ultra low density polyethylene) as well as from homogeneous linear ethylene polymers (such as Tafmer™ products available from Mitsui Petrochemical Industries and Exact™ products available from Exxon Chemical Company).

Exemplary $C_3$–$C_{20}$ α-olefins used in the preparation of the ethylene interpolymers for use herein include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;
(b) Branched chain acyclic dienes such as 5-methyl-1,4-hexadiene; 3,7-dimethyl-1,6-octadiene; and 3,7-dimethyl-1,7-octadiene;
(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene; and
(d) Multi-ring alicyclic fused and bridged ring dienes such as dicyclopentadiene; alkenyl-, alkylidene-, cycloalkenyl-, and cycloalkylidene-substituted norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The linear or substantially linear ethylene interpolymer preferably is an interpolymer of ethylene with at least one $C_3$–$C_{10}$ α-olefin comonomer.

While not wishing to be bound by theory, it is believed that the compositions useful in the practice of the claimed invention owe their improved toughness and impact properties at least in part to the presence of tie molecules. A tie chain is that portion of the polyethylene chain which is expelled from the lamellar crystal due to a short-chain branch imperfection. See, for instance, S. Krimm and T. C. Cheam, Faraday Discuss., Volume 68, page 244 (1979); P. H. Geil, Polymer Single Crystals, published by Wiley, Inc., New York (1963); and P. J. Flory, J. Am Chem. Soc., Volume 84, page 2837 (1962). This expelled chain can then be reincorporated into another crystal, connecting the two crystals together. As the short chain branching increases, more tie chains form until the segments between short-chain branches are not long enough to fold. In addition, tie chain concentration is proportional to molecular weight and can be influenced by the type and amount of comonomer.

The effectiveness of an α-olefin to produce tie chains is proportional to its molecular size. For instance, 1-octene is a very efficient comonomer for promoting tie chain formation, as its hexyl group disrupts crystal formation more than the butyl or ethyl groups of hexene and butene comonomers, respectively. Accordingly, ethylene/octene polymer are believe to have higher levels of tie chains than copolymers of shorter chain comonomers, which is believed to lead to improved toughness. However, if the products are themselves produced in the gas phase or are targeted for competition with polymers produced in the gas phase, one will typically utilize a $C_4$–$C_6$ α-olefin as the comonomer.

The homogeneously branched substantially linear ethylene polymer may be suitably prepared using a constrained geometry catalyst. Constrained geometry metal complexes and methods for their preparation are disclosed in U.S. application Ser. No. 545,403, filed Jul. 3, 1990 (EP-A-416,815); U.S. application Ser. No. 702,475, filed May 20, 1991, now abandoned, (EP-A-514,828); as well as U.S. Pat. Nos. 5,470,993, 5,374,696, 5,231,106, 5,055,438, 5,057,475, 5,096,867, 5,064,802, and 5,132,380. In U.S. Pat. No. 5,721,185, certain borane derivatives of the foregoing constrained geometry catalysts are disclosed and a method for their preparation taught and claimed. In U.S. Pat. No. 5,453,410, combinations of cationic constrained geometry catalysts with an alumoxane were disclosed as suitable olefin polymerization catalysts.

Exemplary constrained geometry metal complexes in which titanium is present in the +4 oxidation state include but are not limited to the following:

(n-butylamido)dimethyl($\eta^5$-tetramethylcyclopentadienyl)silanetitanium(IV)dimethyl;
(n-butylamido)dimethyl($\eta^5$-tetramethylcyclopentadienyl)silanetitanium(IV)dibenzyl;
(t-butylamido)dimethyl($\eta^5$-tetramethylcyclopentadienyl)silanetitanium(IV)dimethyl;
(t-butylamido)dimethyl($\eta^5$-tetramethylcyclopentadienyl)silanetitanium(IV)dibenzyl;
(cyclododecylamido)dimethyl($\eta^5$-tetramethylcyclopentadienyl)silanetitanium(IV)dibenzyl;
(2,4,6-trimethylanilido)dimethyl($\eta^5$-tetramethylcyclopentadienyl)silanetitanium(IV)dibenzyl;
(1-adamantyl-amido)dimethyl($\eta^5$-tetramethylcyclopentadienyl)silanetitanium(IV)dibenzyl;
(t-butylamido)dimethyl($\eta^5$-tetramethylcyclopentadienyl)silanetitanium(IV)dimethyl;
(t-butylamido)dimethyl($\eta^5$-tetramethylcyclopentadienyl)silanetitanium(IV)dibenzyl;
(1-adamantylamido)dimethyl($\eta^5$-tetramethylcyclopentadienyl)-silanetitanium(IV)dimethyl;
(n-butylamido)diisopropoxy($\eta^5$-tetramethylcyclopentadienyl)silanetitanium(IV)dimethyl;
(n-butylamido)diisopropoxy($\eta^5$-tetramethylcyclopentadienyl)silanetitanium(IV)dibenzyl;
(cyclododecylamido)-diisopropoxy($\eta^5$-tetramethylcyclopentadienyl)-silanetitanium(IV)dimethyl;
(cyclododecylamido)diisopropoxy($\eta^5$-tetramethylcyclopentadienyl)-silanetitanium(IV)dibenzyl;
(2,4,6-trimethylanilido)diisopropoxy-($\eta^5$-tetramethylcyclopentadienyl)silanetitanium(IV)dimethyl;
(2,4,6-trimethylanilido)diisopropoxy($\eta^5$-tetramethylcyclopentadienyl)silanetitanium(IV)dibenzyl;
(cyclododecylamido)dimethoxy($\eta^5$-tetramethylcyclopentadienyl)silanetitanium(IV)dimethyl;
(cyclododecylamido)-dimethoxy($\eta^5$-tetramethylcyclopentadienyl)silanetitanium(IV)dibenzyl;
(1-adamantylamido)diisopropoxy($\eta^5$-tetramethylcyclopentadienyl)silanetitanium(IV)dimethyl;

(1-adamantylamido)diisopropoxy($\eta^5$-tetramethylcyclopentadienyl)silanetitanium(IV)dibenzyl;
(n-butylamido)dimethoxy($\eta^5$-tetramethylcyclopentadienyl)silanetitanium(IV)dimethyl;
(n-butylamido)dimethoxy($\eta^5$-tetramethylcyclopentadienyl)silanetitanium(IV)dibenzyl;
(2,4,6-trimethylanilido)dimethoxy($\eta^5$-tetramethylcyclopentadienyl)silanetitanium(IV)dimethyl;
(2,4,6-trimethylanilido)dimethoxy($\eta^5$-tetramethylcyclopentadienyl)silane-titanium(IV)dibenzyl;
(1-adamantylamido)dimethoxy($\eta^5$-tetramethylcyclopentadienyl)silanetitanium(IV)dimethyl;
(1-adamantylamido)dimethoxy($\eta^5$-tetramethylcyclopentadienyl)silanetitanium(IV)dibenzyl;
(n-butylamido)-ethoxymethyl($\eta^5$-tetramethylcyclopentadienyl)silanetitanium(IV)dimethyl;
(n-butylamido)ethoxymethyl($\eta^5$-tetramethylcyclopentadienylsilanetitanium(IV)dibenzyl;
(cyclododecylamido)ethoxymethyl($\eta^5$-tetramethylcyclopentadienyl)silanetitanium(IV)dimethyl;
(cyclododecylamido)ethoxymethyl($\eta^5$-tetramethylcyclopentadienyl)silanetitanium(IV)dibenzyl;
(2,4,6-trimethylanilido)ethoxymethyl-($\eta^5$-tetramethylcyclopentadienyl)silanetitanium(IV)dimethyl;
(2,4,6-trimethylanilido)ethoxymethyl($\eta^5$-tetramethylcyclopentadienyl)silanetitanium(IV)dibenzyl;
(cyclododecylamido)dimethyl($\eta^5$-tetramethylcyclopentadienyl)silanetitanium(IV)dimethyl;
(1-adamantylamido)-ethoxymethyl($\eta^5$-tetramethylcyclopentadienyl)silanetitanium(IV)dimethyl; and
(1-adamantylamido)ethoxymethyl($\eta^5$-tetramethylcyclopentadienyl)silanetitanium(IV)dibenzyl.

Exemplary constrained geometry metal complexes in which titanium is present in the +3 oxidation state include but are not limited to the following:
(n-butylamido)dimethyl($\eta^5$-tetramethylcyclopentadienyl)silanetitanium(III) 2-(N,N-dimethylamino)benzyl;
(t-butylamido)dimethyl($\eta^5$-tetramethylcyclopentadienyl)silanetitanium(III) 2-(N,N-dimethylamino)benzyl;
(cyclododecylamido)dimethyl($\eta^5$-tetramethylcyclopentadienyl)silanetitanium(III) 2-(N,N-dimethylamino)benzyl;
(2,4,6-trimethylanilido)dimethyl($\eta^5$-tetramethylcyclopentadienyl)silanetitanium(III) 2-(N,N-dimethylamino)benzyl;
(1-adamantylamido)dimethyl($\eta^5$-tetramethylcyclopentadienyl)silanetitanium(III) 2-(N,N-dimethylamino)benzyl;
(t-butylamido)dimethyl($\eta^5$-tetramethylcyclopentadienyl)silanetitanium(III) 2-(N,N-dimethylamino)benzyl;
(n-butylamido)diisopropoxy($\eta^5$-tetramethylcyclopentadienyl)silanetitanium(III) 2-(N,N-dimethylamino)benzyl;
(cyclododecylamido)diisopropoxy($\eta^5$-tetramethylcyclopentadienyl)silanetitanium(III) 2-(N,N-dimethylamino)benzyl;
(2,4,6-trimethylanilido)diisopropoxy($\eta^5$-2-methylindenyl)silanetitanium(III) 2-(N,N-dimethylamino)benzyl;
(1-adamantylamido)diisopropoxy($\eta^5$-tetramethylcyclopentadienyl)silanetitanium(III) 2-(N,N-dimethylamino)benzyl;
(n-butylamido)dimethoxy($\eta^5$-tetramethylcyclopentadienyl)silanetitanium(III) 2-(N,N-dimethylamino)benzyl;
(cyclododecylamido)dimethoxy($\eta^5$-tetramethylcyclopentadienyl)silanetitanium(III) 2-(N,N-dimethylamino)benzyl;
(1-adamantylamido)dimethoxy($\eta^5$-tetramethylcyclopentadienyl)silanetitanium(III) 2-(N,N-dimethylamino)benzyl;
(2,4,6-trimethylanilido)dimethoxy($\eta^5$-tetramethylcyclopentadienyl)silanetitanium(III) 2-(N,N-dimethylamino)benzyl;
(n-butylamido)ethoxymethyl($\eta^5$-tetramethylcyclopentadienyl)silanetitanium(III) 2-(N,N-dimethylamino)benzyl;
(cyclododecylamido)ethoxymethyl($\eta^5$-tetramethylcyclopentadienyl)silanetitanium(III) 2-(N,N-dimethylamino)benzyl;
(2,4,6-trimethylanilido)ethoxymethyl($\eta^5$-tetramethylcyclopentadienyl)silanetitanium(III) 2-(N,N-dimethylamino)benzyl; and
(1-adamantylamido)ethoxymethyl($\eta^5$-tetramethylcyclopentadienyl)silanetitanium(III) 2-(N,N-dimethylamino)benzyl.

Exemplary constrained geometry metal complexes in which titanium is present in the +2 oxidation state include but are not limited to the following:
(n-butylamido)-dimethyl-($\eta^5$-tetramethylcyclopentadienyl)silanetitanium(II) 1,4-diphenyl-1,3-butadiene;
(n-butylamido)dimethyl($\eta^5$-tetramethylcyclopentadienyl)silanetitanium(II) 1,3-pentadiene;
(t-butylamido)dimethyl($\eta^5$-tetramethylcyclopentadienyl)silanetitanium(II) 1,4-diphenyl-1,3-butadiene;
(t-butylamido)dimethyl($\eta^5$-tetramethylcyclopentadienyl)silanetitanium(II) 1,3-pentadiene;
(cyclododecylamido)dimethyl($\eta^5$-tetramethylcyclopentadienyl)silanetitanium(II) 1,4-diphenyl-1,3-butadiene;
(cyclododecylamido)dimethyl($\eta^5$-tetramethylcyclopentadienyl)silanetitanium(II) 1,3-pentadiene;
(2,4,6-trimethylanilido)dimethyl($\eta^5$-tetramethylcyclopentadienyl)silanetitanium(II) 1,4-diphenyl-1,3-butadiene;
(2,4,6-trimethylanilido)dimethyl($\eta^5$-tetramethylcyclopentadienyl)silanetitanium(II) 1,3-pentadiene;
(2,4,6-trimethylanilido)dimethyl($\eta^5$-tetramethylcyclopentadienyl)silanetitanium(IV)dimethyl;
(1-adamantylamido)dimethyl($\eta^5$-tetramethylcyclopentadienyl)silane-titanium(II) 1,4-diphenyl-1,3-butadiene;
(1-adamantylamido)dimethyl($\eta^5$-tetramethylcyclopentadienyl)silanetitanium(II) 1,3-pentadiene;
(t-butylamido)dimethyl($\eta^5$-tetramethylcyclopentadienyl)silanetitanium(II) 1,4-diphenyl-1,3-butadiene;
(t-butylamido)dimethyl($\eta^5$-tetramethylcyclopentadienyl)silanetitanium(II) 1,3-pentadiene;
(n-butylamido)diisopropoxy($\eta^5$-tetramethylcyclopentadienyl)silanetitanium(II) 1,4-diphenyl-1,3-butadiene;
(n-butylamido)diisopropoxy($\eta^5$-tetramethylcyclopentadienyl)silanetitanium(II) 1,3-pentadiene;
(cyclododecylamido)-diisopropoxy($\eta^5$-tetramethylcyclopentadienyl)silanetitanium(II) 1,4-diphenyl-1,3-butadiene;
(cyclododecylamido)diisopropoxy($\eta^5$-tetramethylcyclopentadienyl)silanetitanium(II) 1,3-pentadiene;
(2,4,6-trimethylanilido)diisopropoxy($\eta^{5-2}$-methyl-indenyl)silanetitanium(II) 1,4-diphenyl-1,3-butadiene;

(2,4,6-trimethylanilido)-diisopropoxy(η⁵-tetramethylcyclopentadienyl)silanetitanium(II) 1,3-pentadiene;
(1-adamantylamido)diisopropoxy(η⁵-tetramethylcyclopentadienyl)silanetitanium(II) 1,4-diphenyl-1,3-butadiene;
(1-adamantylamido)diisopropoxy(η⁵-tetramethylcyclopentadienyl)silanetitanium(II) 1,3-pentadiene;
(n-butylamido)dimethoxy(η⁵-tetramethylcyclopentadienyl)silanetitanium(II) 1,4-diphenyl-1,3-butadiene;
(n-butylamido)dimethoxy(η⁵-tetramethylcyclopentadienyl)silanetitanium(II) 1,3-pentadiene;
(cyclododecylamido)dimethoxy(η⁵-tetramethylcyclopentadienyl)silanetitanium(II) 1,4-diphenyl-1,3-butadiene;
(cyclododecylamido)dimethoxy(η⁵-tetramethylcyclopentadienyl)silanetitanium(II) 1,3-pentadiene;
(2,4,6-trimethylanilido)dimethoxy(η⁵-tetramethylcyclopentadienyl)silanetitanium(II) 1,4-diphenyl-1,3-butadiene;
(2,4,6-trimethylanilido)dimethoxy(η⁵-tetramethylcyclopentadienyl)silanetitanium(II) 1,3-pentadiene;
(1-adamantyl-amido)dimethoxy(η⁵-tetramethylcyclopentadienyl)silanetitanium(II) 1,4-diphenyl-1,3-butadiene;
(1-adamantylamido)dimethoxy(η⁵-tetramethylcyclopentadienyl)silanetitanium(II) 1,3-pentadiene;
(n-butylamido)ethoxymethyl(η⁵-tetramethylcyclopentadienyl)silanetitanium(II) 1,4-diphenyl-1,3-butadiene;
(n-butylamido)ethoxymethyl(η⁵-tetramethylcyclopentadienyl)silanetitanium(II) 1,3-pentadiene;
(cyclododecylamido)ethoxymethyl(η⁵-tetramethylcyclopentadienyl)silanetitanium(II) 1,4-diphenyl-1,3-butadiene;
(cyclododecylamido)ethoxymethyl(η⁵-tetramethylcyclopentadienyl)silanetitanium(II) 1,3-pentadiene;
(2,4,6-trimethylanilido)ethoxymethyl(η⁵-tetramethylcyclopentadienyl)silanetitanium(II) 1,4-diphenyl-1,3-butadiene;
(2,4,6-trimethylanilido)ethoxymethyl (η⁵-tetramethylcyclopentadienyl)silanetitanium(II) 1,3-pentadiene;
(1-adamantylamido)ethoxymethyl(η⁵-tetramethylcyclopentadienyl)silanetitanium(II) 1,4-diphenyl-1,3-butadiene; and
(1-adamantylamido)ethoxymethyl(η⁵-tetramethylcyclopentadienyl)silanetitanium(II) 1,3-pentadiene.

The complexes can be prepared by use of well known synthetic techniques. The reactions are conducted in a suitable noninterfering solvent at a temperature from −100 to 300° C., preferably from −78 to 100° C., most preferably from 0 to 50° C. A reducing agent may be used to cause the metal to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Ser. No. 07/547,718), EP-A-520,732 (equivalent to U.S. Ser. No. 07/876,268), WO 95/00683 (equivalent to U.S. Ser. No. 08/82,201), WO 97/35893 (equivalent to U.S. Ser. No. 08/818,530), and EP-A-520,732 (equivalent to U.S. Ser. No. 07/884,966 filed May 1, 1992).

Suitable activating cocatalysts and activating techniques have been previously taught with respect to different metal complexes in the following references; EP-A 277,003, U.S. Pat. Nos. 5,153,157, 5,064,802, EP-A468,651 (equivalent to U.S. Ser. No. 07/547,718, now abandoned), EP-A-520,732 (equivalent to U.S. Ser. No. 07/876,268, now U.S. Pat. No. 5,721,185), WO 95/00683 (equivalent to U.S. Ser. No. 08/082,201, now U.S. Pat. No. 5,372,682), WO 97/35893 (equivalent to U.S. Ser. No. 08/818,530, now U.S. Pat. No. 5,919,983), and EP-A-520,732 (equivalent to U.S. Ser. No. 07/884,966 filed May 1, 1992, now U.S. Pat. No. 5,350,723).

Illustrative, but not limiting, examples of boron compounds which may be used as an activating cocatalysts are: tri-substituted ammonium salts such as: trimethylammonium tetrakis(pentafluorophenyl)borate; triethylaimonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluoro-phenyl)borate; N,N-dimethylanilinium tetrakis(pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl)borate; N,N-dimethylanilinium tetrakis(4-(triisopropylsilyl)-2,3,5,6-tetrafluorophenyl) borate; N,N-dimethylanilinium pentafluorophenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl)borate; tripropylammonium tetrakis(2,3,4,6-tetrafluorophenyl) borate; tri(n-butyl)ammonium tetrakis(2,3,4,6-tetrafluorophenyl)borate; dimethyl(t-butyl)ammonium tetrakis(2,3,4,6-tetrafluorophenyl)borate; N,N-dimethylanilinium tetrakis(2,3,4,6-tetrafluorophenyl)borate; N,N-diethylanilinium tetrakis(2,3,4,6-tetrafluorophenyl) borate; and N,N-dimethyl-2,4,6-trimethylanilinium tetrakis (2,3,4,6-tetrafluorophenyl)borate;

disubstituted ammonium salts such as: di-(isopropyl)ammonium tetrakis(pentafluorophenyl)borate; and dicyclohexylammonium tetrakis(pentafluorophenyl)borate;

trisubstituted phosphonium salts such as: triphenylphosphonium tetrakis(pentafluorophenyl)borate; tri(o-tolyl)phosphonium tetrakis(pentafluorophenyl)borate; and tri(2,6-dimethylphenyl)phosphonium tetrakis (pentafluorophenyl)borate;

disubstituted oxonium salts such as: diphenyloxonium tetrakis(pentafluorophenyl)borate; di(o-tolyl)oxonium tetrakis(pentafluorophenyl)borate; and di(2,6-dimethylphenyl)oxonium tetrakis(pentafluorophenyl)borate; and disubstituted sulfonium salts such as: diphenylsulfonium tetrakis(pentafluorophenyl)borate; di(o-tolyl)sulfonium tetrakis(pentafluorophenyl)borate; and bis(2,6-dimethylphenyl)sulfonium tetrakis(pentafluorophenyl) borate.

Alternate preferred cocatalysts may be represented by the following general formula:

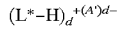

wherein:
L* is a neutral Lewis base;
(L*–H)+ is a Bronsted acid;
$A'^{d-}$ is a noncoordinating, compatible anion having a charge of d–, and
d is an integer from 1 to 3.

More preferably $A'^{d-}$ corresponds to the formula: $[M^*Q_4]^-$;
wherein:
M* is boron or aluminum in the +3 formal oxidation state; and
Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal substicuted-hydrocarbyl, organometalloid substituted-hydrocarbyl, halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A'^-$. Activating cocatalysts comprising boron which are particularly useful may be represented by the following general formula:

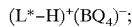

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst are tri-substituted ammonium salts such as:
trimethylammonium tetraphenylborate,
methyldioctadecylammonium tetraphenylborate,
triethylammonium tetraphenylborate,
tripropylammonium tetraphenylborate,
tri(o-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium)tetrakis (pentafluorophenyl)borate,
trimethylammonium tetrakis(pentafluorophenyl)borate,
methylditetradecylammonium tetrakis(pentafluorophenyl) borate,
methyldioctadecylammonium tetrakis(pentafluorophenyl) borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium)tetrakis (pentafluorophenyl)borate,
trimethylammonium tetrakis(2,3,4,6-tetrafluorophenyl) borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate, N,N-dimethylanilinium tetrakis (2,3,4,6-tetrafluorophenyl)borate,
N,N-diethylanilinium tetrakis(2,3,4,6-tetrafluorophenyl) borate,
and N,N-dimethyl-(2,4,6-trimethylanilinium)tetrakis-(2,3,4, 6-tetrafluorophenyl)borate.

Dialkyl ammonium salts such as:
dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:
triphenylphosphonium tetrakis(pentafluorophenyl)borate,
methyldioctadecylphosphonium tetrakis(pentafluorophenyl) borate,
and tri(2,6-dimethylphenyl)phosphoniumtetrakis (pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis (pentafluorophenyl)borate and methyldi(tetradecyl)-ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

Another suitable ammonium salt, especially for use in heterogeneous catalyst systems, is formed upon reaction of a organometal compound, especially a tri($C_{1-6}$alkyl) aluminum compound with an ammonium salt of a hydroxyaryltris(fluoroaryl)borate compound. The resulting compound is an organometaloxyaryltris(fluoroaryl)borate compound which is generally insoluble in aliphatic liquids. Typically, such compounds are advantageously precipitated on support materials, such as silica, alumina or trialkylaluminum passivated silica, to form a supported cocatalyst mixture. Examples of suitable compounds include the reaction product of a tri($C_{1-6}$ alkyl)aluminum compound with the ammonium salt of hydroxyaryltris(aryl)borate.

Suitable hydroxyaryltris(aryl)-borates include the ammonium salts, especially the forgoing long chain alkyl ammonium salts of:
(4-dimethylaluminumoxy-1-phenyl)tris(pentafluorophenyl) borate, (4-dimethylaluminumoxy-3,5-di(trimethylsilyl)-1-phenyl) tris(pentafluorophenyl)borate,
(4-dimethylaluminumoxy-3,5-di(t-butyl)-1-phenyl)tris (pentafluorophenyl)borate,
(4-dimethylaluminumoxy-1-benzyl)tris(pentafluorophenyl) borate,
(4-dimethylaluminumoxy-3-methyl-1-phenyl)tris (pentafluorophenyl)borate,
(4-dimethylaluminumoxy-tetrafluoro-1-phenyl)tris (pentafluorophenyl)borate,
(5-dimethylaluminumoxy-2-naphthyl)tris (pentafluorophenyl)borate,
4-(4-dimethylaluminumoxy-1-phenyl)phenyltris (pentafluorophenyl)borate,
4-(2-(4-(dimethylaluminumoxyphenyl)propane-2-yl) phenyloxy)tris(pentafluorophenyl)borate,
(4-diethylaluminumoxy-1-phenyl)tris(pentafluorophenyl) borate,
(4-diethylaluminumoxy-3,5-di(trimethylsilyl)-1-phenyl)tris (pentafluorophenyl)borate,
(4-diethylaluminumoxy-3,5-di(t-butyl)-1-phenyl)tris (pentafluorophenyl)borate,
(4-diethylaluminumoxy-1-benzyl)tris(pentafluorophenyl) borate,
(4-diethylaluminumoxy-3-methyl-1-phenyl)tris (pentafluorophenyl)borate,
(4-diethylaluminumoxy-tetrafluoro-1-phenyl)tris (pentafluorophenyl)borate,
(5-diethylaluminumoxy-2-naphthyl)tris(pentafluorophenyl) borate,
4-(4-diethylaluminumoxy-1-phenyl)phenyltris (pentafluorophenyl)borate,
4-(2-(4-(diethylaluminumoxyphenyl)propane-2-yl) phenyloxy)tris(pentafluorophenyl)borate,
(4-diisopropylaluminumoxy-1-phenyl)tris (pentafluorophenyl)borate,
(4-diisopropylaluminumoxy-3,5-di(trimethylsilyl)-1-phenyl)tris(pentafluorophenyl)borate,
(4-diisopropylaluminumoxy-3,5-di(t-butyl)-1-phenyl)tris (pentafluorophenyl)borate,
(4-diisopropylaluminumoxy-1-benzyl)tris (pentafluorophenyl)borate,
(4-diisopropylaluminumoxy-3-methyl-1-phenyl)tris (pentafluorophenyl)borate,
(4-diisopropylaluminumoxy-tetrafluoro-1-phenyl)tris (pentafluorophenyl)borate,
(5-diisopropylaluminumoxy-2-naphthyl)tris (pentafluorophenyl)borate,
4-(4-diisopropylaluminumoxy-1-phenyl)phenyltris (pentafluorophenyl)borate, and
4-(2-(4-(diisopropylaluminumoxyphenyl)propane-2-yl) phenyloxy)tris(pentafluorophenyl)borate.

An especially preferred ammonium compound is methylditetradecylammonium (4-diethylaluminumoxy-1-phenyl) tris(pentafluorophenyl)borate, methyldihexadecylammonium (4-diethylaluminumoxy-1-phenyl)tris (pentafluorophenyl)borate, methyldioctadecyl-ammonium (4-diethylaluminumoxy-1-phenyl)tris(pentafluorophenyl) borate, and mixtures thereof. The foregoing complexes are disclosed in WO96/28480, which is equivalent to U.S. Ser. No. 08/610,647, filed Mar. 4, 1996, U.S. Pat No. 5,834,393 and in U.S. Ser. No. 08/768,518, filed Dec. 18, 1996 now U.S. Pat. No. 5,783,512.

Alumoxanes, especially methylalumoxane or triisobutylaluminum modified methylalumoxane are also suitable activators and may be used for activating the present metal complexes.

The molar ratio of metal complex:activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from 1:3:5. A most preferred activating cocatalyst is trispentafluorophynylborane (FAB), optionally in combination with an alumoxane, the molar ratio of metal complex:FAB:alumoxane being from 1:1:5 to 1:10:50.

A support, especially silica, alumina, or a polymer (especially poly(tetrafluoroethylene) or a polyolefin) may be employed, and desirably is employed when the catalysts are used in a gas phase or slurry polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas such as, for example, nitrogen.

The polymerization will preferably be conducted in a continuous polymerization process. In a continuous process, ethylene, comonomer, optionally solvent and diene, are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres (355 MPa). The reactor temperature should be greater than 80° C., typically from 100° C. to 250° C., and preferably from 100° C. to 150° C., with temperatures at the higher end of the range, temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. The molar range of hydrogen:ethylene will typically range from 0.0:1 to 2.5:1.

Generally the polymerization process is carried out at a pressure of from 10 to 1000 psi (70 to 7000 kPa), most preferably from 400 to 800 psi (280 to 5500 kPa) The polymerization is generally conducted at a temperature of from 80 to 250° C., preferably from 90 to 170° C., and most preferably from greater than 95° C. to 140° C.

In most polymerization reactions the molar ratio of catalyst:polymerizable compounds employed is from 10–12:1 to 10–1:1, more preferably from 10–9:1 to 10–5:1. Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) in the feed will typically be from 2.5:1 to 12:1, beyond which point catalyst efficiency suffers. The most typical solvent:ethylene ratio (weight basis) in the feed is in the range of from 2.5:1 to 6:1.

The ethylene/α-olefin interpolymer may alternatively be prepared in a gas phase polymerization process, using the catalysts as described above as supported in an inert support, such as silica. The ethylene/α-olefin interpolymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

The polymers may be produced via a continuous (as opposed to a batch) controlled polymerization process using at least one reactor, but can also be produced using multiple reactors (for example, using a multiple reactor configuration as described in U.S. Pat. No. 3,914,342 (Mitchell)), with the second ethylene polymer polymerized in at least one other reactor. The multiple reactors can be operated in series or in parallel, with at least one constrained geometry catalyst employed in at least one of the reactors at a polymerization temperature and pressure sufficient to produce the ethylene polymers having the desired properties.

The melt index of the polymer compositions useful in the present invention will be chosen on the basis of the targeted end use application. For instance, polymer compositions having a melt index of at least 2 grams/10 minutes, preferably at least 3 grams/10 minutes; and preferably no more than 8 grams/10 minutes, preferably no more than 7 grams/10 minutes, will be usefully employed in general purpose blown film applications.

Likewise, polymer compositions having a melt index of less than 1 gram/10 minutes, preferably less than 0.75 gram/10 minutes, will be usefully employed in heavy duty bags and other high strength film applications.

Those films of the invention which are characterized as higher clarity films, will preferably be characterized as having a haze of less than 12 percent, preferably less than 11 percent, more preferably less than 10 percent. For instance, exemplary of the polymer compositions which lead to the production of such most preferred films, are the ethylene/α-olefin interpolymers of the invention having a melt index of less than 1 gram/10 minutes, preferably less than 0.75 gram/10 minutes, and having an $I_{10}/I_2$ of at least 10, preferably at least 12.

The compositions of the invention may optionally be melt-blended with other thermoplastic polymers, such as low density polyethylene, linear low density polyethylene, high density polyethylene, ethylene vinyl acetate, ethylene vinyl alcohol, polypropylene, polycarbonate, and ethylene/styrene interpolymers, provided that the formation of such a blend does not deleteriously interfere with the desired performance. Typically, such an additional thermoplastic polymer will be provided to the blend in an amount of from 1 to 30 weight percent, preferably from 1 to 15 weight percent.

Certain of the compositions of the invention will be prepared in a dual reactor configuration in accordance with techniques known in the art. For instance, dual reactor systems are disclosed and claimed in U.S. Ser. No. 08/858,664, now U.S. Pat. No. 6,538,070 (EP 619,827) and U.S. Ser. No. 08/747,419, now U.S. Pat. No. 5,844,045 (PCT Publication WO 94/17112).

EXAMPLES

High Processing Polymers Having an $I_2$ Greater than 2 g/10 Minutes

The polymers of Comparative Examples A and B were commercially available low density polyethylene.

The polymers of Comparative Examples C, D, and E, were substantially linear ethylene/α-olefin copolymers having an $I_{10}/I_2$ of less than 9 and an $M_w/M_n$ of from 2.175 to 2.543.

The polymers of Examples 1–3 were substantially-linear ethylene/butene compositions prepared in a parallel dual reactor polymerization process as described in U.S. Ser. No. 08/858,664, now U.S. Pat. No. 6,538,070 (EP 619,827). In each example, a catalyst comprising (t-butylamido) dimethyl)η$^5$-tetramethylcyclopentadienyl)silanetitanium(II) 1,3-pentadiene catalyst, activated with trispentafluorophenylborane and triisopropylaluminum modified methylalumoxane (MMAO, available from Akzo Chemical) was employed. In each example, the reactor conditions were selected such as to produce a product having a uniform density (that is, each reactor was run such as to give a product having the same density), but which is bimodal in terms of molecular weight. In Table One, Parts I and II, the properties for the products of the first and second reactors are indicated by R1 and R2, respectively.

For instance, in the case of Example 3, the following reactor conditions may be employed:

TABLE ONE

Part I

| | R1 | R2 |
|---|---|---|
| Solvent Feed (Kg/h) | 15.0 | 27.0 |
| Ethylene Feed (Kg/h) | 2.2 | 2.95 |
| Hydrogen Feed (SCCM) | 0.3 | 61 |
| Butene Feed (kg/h) | 0.38 | 0.24 |
| Ethylene Conv. % | 80 | 90 |
| Feed Temp (C.) | 15 | 15 |
| Reactor Temp (C.) | 110 | 120 |
| Catalyst Flow (kg/h) | $9.13 \times 10^{-7}$ | $4.6 \times 10^{-6}$ |
| Primary | $2.74 \times 10^{-6}$ | $1.38 \times 10^{-5}$ |
| Co-catalyst Flow (kg/h) | | |
| Secondary Co-catalyst Flow (kg/h) | $4.6 \times 10^{-6}$ | $2.3 \times 10^{-5}$ |

The polymer of Example 4 was a substantially linear ethylene/1-butene copolymer prepared in a single solution polymerization reactor. The polymer of Example 4 was prepared in accordance with the procedures of U.S. Pat. Nos. 5,272,236 and 5,278,272, utilizing a (t-butylamido) dimethyl)η$_5$-tetramethylcyclopentadienyl)silanetitanium(II) 1,3-pentadiene catalyst, activated with trispentafluorophenylborane and modified methylalumoxane.

The properties of the polymers of Comparative Examples A–E and of Examples 1–4 are set forth in the following Table One, Part II.

TABLE ONE

Part II

| | Comparative Example A | Comparative Example B | Comparative Example C | Comparative Example D | Comparative Example E | Example 1 | Example 2 | Example 3 | Example 4 |
|---|---|---|---|---|---|---|---|---|---|
| Process | Autoclave | Tubular | Single Reactor | Single Reactor | Single Reactor | Dual Reactor | Dual Reactor | Dual Reactor | Single Reactor |
| Comonomer | — | — | Octene | Butene | Butene | Butene | Butene | Butene | Butene |
| Density (g/cc) | 0.9210 | 0.9198 | 0.9183 | 0.9165 | 0.9145 | 0.9209 | 0.9160 | 0.9150 | 0.918 |
| $I_2$ (g/10 min) | 5.0 | 5.0 | 6.2 | 9.6 | 7.5 | 5.0 | 2.8 | 5.4 | 5.5 |
| $I_{10}/I_2$ | 11.7 | 12.5 | 8.8 | 7.6 | 7.7 | 9.4 | 10.0 | 11.7 | 9.2 |
| R1 $I_2$ (g/10 min) | — | — | — | — | — | 0.3 | 0.8 | 0.1 | — |
| R2 $I_2$ (g/10 min) | — | — | — | — | — | 60 | 100 | 50 | — |
| R1 $I_{10}/I_2$ (g/10 min) | — | — | — | — | — | 8.5 | 8.0 | 9.0 | — |
| R2 $I_{10}/I_2$ (g/10 min) | — | — | — | — | — | 7.0 | 7.0 | 7.0 | — |
| Reactor Split | — | — | — | — | — | 35 | 80 | 35 | — |
| Melting Temperature (° C.) | 110.9 | 108.0 | 113.1 | 106.0 | 104.8 | 108.1 | 110.8 | 102.7 | — |
| Crystallization Temp (° C.) | 97.8 | 94.3 | 98.2 | 89.8 | 90.0 | 93.6 | 96.8 | 88.0 | — |
| Crystallinity (%) | 48.5 | 48.9 | 50.2 | 44.8 | 45.6 | 47.0 | 44.5 | 41.7 | — |
| Weight Average Molecular Weight (Mw) | 66400 | 87900 | 55700 | 52300 | 55700 | 62400 | 67000 | 68700 | 56600 |
| Number Average Molecular Weight (Mn) | 15300 | 15600 | 21900 | 22900 | 25600 | 19900 | 14800 | 18200 | 25727 |
| Mw/Mn | 4.339 | 5.634 | 2.543 | 2.283 | 2.175 | 3.135 | 4.527 | 3.774 | 2.2 |
| Extruder Back Pressure (psi (MPa)) | 1990 (13.7) | 1654 (11.4) | 1888 (13.0) | 2050 (14.1) | 2100 (14.5) | 1781 (12.3) | 2758 (19.0) | 2125 (14.6) | 2200 (15.2) |
| Motor Load (amps) | 24 | 21 | 27 | 27 | 29 | 25 | 33 | 22 | 26 |
| Haze (%) | 8.8 | 7.8 | 19.1 | 37.5 | 25.2 | 10.7 | 11.9 | 10.8 | 12.8 |

Note: Density measured accordance with ASTM D-792
$I_2$ measured accordance with ASTM D-1238, Condition 190° C./2.16 Kg
$I_{10}$ measured accordance with ASTM D-1238, Condition 190° C./10 Kg
Haze measured accordance with ASTM D-1003

Evaluation of Films Fabricated from the Polymer of Comparative Example C and Example 1

Films were produced on an Egan blown film line (2 inch (5 cm) extruder, 3 inch die (7.5 cm), 40 mil (1 mm) die gap. Table Two shows the fabrication conditions used for producing the blown films. Blown films were fabricated at 340° F. (171° C.) melt temperature. The back pressure and motor amps are similar for the polymers of Comparative Examples A and C and of Example 1. The polymer of Comparative Example B processed with a lower back pressure and motor amps.

TABLE TWO

| Description | Comparative Example A | Comparative Example B | Comparative Example C | Example 1 |
|---|---|---|---|---|
| Melt Temp. (° F. (° C.)) | 339 (171) | 342 (172) | 338 (170) | 341 (172) |
| Back Pressure (psi (MPa)) | 1645 ± 92 (11.3 ± 0.6) | 1484 ± 73 (10.2 ± 0.5) | 1614 ± 127 (11.1 ± 0.9) | 1531 ± 112 (10.6 ± 0.8) |
| Motor Load (amps) | 21 | 19 | 24 | 24 |
| Output Rate (lb/hr (kg/hr)) | 31 (14) | 31 (14) | 31 (14) | 31 (14) |
| Frost Line Height (in (cm)) | 10–10.5 (25–27) | 12 (30) | 9–9.5 (23–24) | 10 (25) |
| Layflat (in (cm)) | 87/16 (21.4) | 87/16 (21.4) | 87/16 (21.4) | 87/16 (21.4) |
| Gauge (mils (mm)) | 1.4–1.6 (0.036–0.041) | 1.4–1.6 (0.036–0.041) | 1.4–1.6 (0.036–0.041) | 1.4–1.6 (0.036–0.041) |

Extruder Temperature Profiles:
For samples Comparative Examples A, B and C: 300/300/325/325/325/325/325/325/325° F. (149/149/163/163/163/163/163/163/163° C.)
For Example 1: 300/300/325/325/325/325/325/325/345° F. (149/149/163/163/163/163/163/163/174° C.)

Table Three shows the mechanical and optical properties of the resultant films.

TABLE THREE

| Description | Comparative Example A | Comparative Example B | Comparative Example C | Example 1 |
|---|---|---|---|---|
| 45 Degree Gloss (%) | 76.4 ± 1.2 | 72.6 ± 0.8 | 42.0 ± 4.0 | 56.9 ± 3.7 |
| Haze (%) | 7.9 ± 0.1 | 6.3 ± 0.2 | 17.3 ± 0.4 | 9.2 ± 1.4 |
| Dart Impact Type A | 90 | 82 | 115 | 74 |
| CD Elmendorf Tear (g/mil (g/mm)) | 203 ± 10 (8000 ± 390) | 99 ± 14 (3900 ± 551) | 573 ± 26 (23000 ± 1000) | 223 ± 13 (8800 ± 512) |
| MD Elmendorf Tear (g/mil (g/mm)) | 396 ± 35 (15600 ± 1400) | 311 ± 21 (12200 ± 830) | 196 ± 67 (7720 ± 2600) | 56 ± 9 (2200 ± 350) |
| CD Elongation (%) | 591 ± 16 | 503 ± 46 | 706 ± 32 | 696 ± 42 |
| MD Elongation (%) | 370 ± 15 | 198 ± 14 | 649 ± 16 | 566 ± 13 |
| CD Toughness (ft-lb/in³ | 723 ± 33 (1.605 × | 534 ± 74 (1.185 × | 1049 ± 54 (2.329 × | 873 ± 74 (1.938 × |

TABLE THREE-continued

| Description | Comparative Example A | Comparative Example B | Comparative Example C | Example 1 |
|---|---|---|---|---|
| (J/cm$^3$)) | 10$^4$ ± 730) | 10$^4$ ± 1600) | 10$^4$ ± 1900) | 10$^4$ ± 1600) |
| MD Toughness (ft-lb/in$^3$ (J/cm$^3$)) | 726 ± 46 (1.612 × 10$^4$ ± 1000) | 398 ± 21 (8.836 × 10$^3$ ± 470) | 1305 ± 68 (2.897 × 10$^4$ ± 1500) | 856 ± 62 (1.900 × 10$^4$ ± 1400) |
| CD Tensiles (psi (MPa)) | 2179 ± 87 (15.0 ± 0.6) | 1822 ± 181 (12.6 ± 1.2) | 3306 ± 194 (22.8 ± 1.3) | 2382 ± 147 (16.4 ± 1.0) |
| MD Tensiles (psi (MPa)) | 3089 ± 114 (21.3 ± 0.79) | 3024 ± 92 (20.8 ± 0.63) | 4541 ± 176 (31.3 ± 1.2) | 3084 ± 220 (21.3 ± 1.5) |

In order to improve the haze of the blown films, blends with various polymers were investigated. Blends of the polymer of Comparative Example C and Example 1 were made with 10% LDPE 4012 (12 MI, 0.922 g/cm$^3$). Table Four shows the fabrication conditions used for producing the blown films. These films were produced on the Egan blown film line (2 inch (5 cm) extruder, 3 inch (7.5 cm) die, 40 mil (1 mm) die gap). Blown films were fabricated at 315° F. (157° C.) melt temperature.

TABLE FOUR

| Description | Comparative Example A | 90% Comparative Example C and 10% LDPE 4012 | 90% Example 1 and 10% LDPE 4012 |
|---|---|---|---|
| Melt Temp. (° F. (° C.)) | 317 (158) | 312 (156) | 312 (156) |
| Back Pressure (psi (MPa)) | 1809 ± 118 (12.5 ± 0.8) | 2169 ± 177 (15.0 ± 0.1) | 2235 ± 92 (15.4 ± 0.6) |
| Motor Load (amps) | 26 | 27 | 26 |
| Output Rate (lb/hr (kg/hr)) | 32 (14.5) | 33 (15) | 33 (15) |
| Frost Line Height (in (cm)) | 8–8.5 (20–22) | 7–9 (18–23) | 7–8 (10–20) |
| Layflat (in (cm)) | 8 3/8 (21) | 8 (20) | 8 (20) |
| Gauge (mils (mm)) | 1.4–1.5 (0.036–0.038) | 1.4–1.5 (0.036–0.038) | 1.5–1.6 (0.038–0.041) |
| 45 Degree Gloss (%) | 76.4 ± 1.2 | 63.9 ± 0.9 | 64.6 ± 1.2 |
| Haze (%) | 7.9 ± 0.1 | 9.1 ± 0.1 | 8.0 ± 0.4 |

Extruder Temperature Profiles: 300/300/300/300/300/300/300/300/300° F. (149/149/149/149/149/149/149/149/149° C.)

Table Four further shows the optical properties of the resultant films. Films produced with the blends described above exhibited improved optical properties. In the case of the blend of 10 percent LDPE 4012 in the polymer of Example 1, this specific blend exhibited similar haze value as the Comparative Example A.

The polymer of Example 1 was shown to not detrimentally affect the mechanical properties of films prepared with heterogeneously branched linear low density polyethylene. Films were fabricated with blends of 12.5 weight percent of the polymers of Comparative Examples A–C and Example 1, with 78.5 weight percent DOWLEX 2045. Table Five shows fabrication conditions used for producing the blown films. These films were produced on the Gloucester blown film line (2.5 inch (6 cm) extruder, 6 inch (15 cm) die, 70 mil (1.8 mm) die gap). The processability of the blend of Example One with the LLDPE showed some improvement in extruder back pressure over the blends of Comparative Examples A and B with the LLDPE.

TABLE FIVE

| Description | DOWLEX 2045 + Comparative Example A (7:1) | DOWLEX 2045 + Comparative Example B (7:1) | DOWLEX 2045 + Comparative Example C (7:1) | DOWLEX 2045 + Example One (7:1) |
|---|---|---|---|---|
| Melt Temp. (° F. (° C.)) | 400 (204) | 397 (203) | 398 (203) | 398 (203) |
| Back Pressure (psi (MPa)) | 5530 (38.1) | 5780 (39.8) | 5470 (37.7) | 5440 (37.5) |
| Motor Load (amps) | 84 | 85 | 86 | 87 |
| Output Rate (lb/hr (kg/hr)) | 110 (50) | 110 (50) | 110 (50) | 110 (50) |
| Frost Line Height (in (cm)) | 25 (64) | 25 (64) | 25 (64) | 25 (64) |
| Gauge (mils (mm)) | 1.5 (0.038) | 1.5 (0.038) | 1.5 (0.038) | 1.5 (0038) |

Extruder Temperature Profiles: 275/290/295/295/375/375/375/375° F. (135/143/146/146/191/191/191/191° C.)

Table Six shows the mechanical and optical properties of the resultant blown film. Optical properties of the blend using the polymer of Example One was slightly inferior to that of the blends using the polymer of Comparative Examples A and B. The mechanical properties were comparable with the following exceptions noted: the films prepared from the blends using the polymer of Example One exhibited higher dart impact and higher MD Elmendorf tear that the films prepared from the blends using the polymers of Comparative Examples A and B.

TABLE SIX

| Description | DOWLEX 2045 + Comparative Example A (7:1) | DOWLEX 2045 + Comparative Example B (7:1) | DOWLEX 2045 + Comparative Example C (7:1) | DOWLEX 2045 + Example One (7:1) |
|---|---|---|---|---|
| 45 Degree Gloss (%) | 58.4 ± 4.2 | 71.0 ± 1.9 | 54.3 ± 4.1 | 49.6 ± 5.2 |
| Haze (%) | 11.5 ± 0.5 | 7.9 ± 0.4 | 13.8 ± 0.2 | 14.5 ± 0.6 |
| Dart Impact Type A | 212 | 206 | 254 | 252 |
| CD Elmendorf Tear (g) | 736 ± 47 | 742 ± 18 | 685 ± 20 | 648 ± 41 |
| MD Elmendorf Tear (g) | 261 ± 56 | 121 ± 9 | 387 ± 87 | 401 ± 76 |
| CD Elongation (%) | 768 ± 38 | 748 ± 38 | 769 ± 34 | 802 ± 21 |
| MD Elangation (%) | 585 ± 17 | 602 ± 18 | 620 ± 16 | 605 ± 17 |
| CD Tensile Strength (psi (MPa)) | 5795 ± 514 (40.0 ± 3.54) | 5655 ± 521 (39.0 ± 3.59) | 6050 ± 509 (41.7 ± 3.51) | 6187 ± 365 (42.7 ± 2.52) |
| MD Tensile Strength (psi (MPa)) | 6471 ± 338 (44.6 ± 2.33) | 6876 ± 240 (47.4 ± 1.65) | 7310 ± 318 (50.4 ± 2.19) | 6880 ± 572 (47.4 ± 3.94) |
| CD Toughness (ft-lb/in$^3$ (J/cm$^3$)) | 1584 ± 161 (3.516 × 10$^4$ ± 3570) | 1530 ± 146 (3.397 × 10$^4$ ± 3240) | 1618 ± 171 (3.592 × 10$^4$ ± 3800) | 1684 ± 116 (3.738 × 10$^4$ ± 2580) |

TABLE SIX-continued

| Description | DOWLEX 2045 + Comparative Example A (7:1) | DOWLEX 2045 + Comparative Example B (7:1) | DOWLEX 2045 + Comparative Example C (7:1) | DOWLEX 2045 + Example One (7:1) |
|---|---|---|---|---|
| MD Toughness ft-lb/in$^3$ (J/cm$^3$)) | 1426 ± 91 (3.166 × 10$^4$ ± 2020) | 1575 ± 60 (3.497 × 10$^4$ ± 1330) | 1542 ± 94 (3.423 × 10$^4$ ± 2090) | 1400 ± 135 (3.108 × 10$^4$ ± 3000) |

Films were prepared using the polymer of Example 2. The films were produced on an Egan blown film line (2 inch (5 cm) extruder, 3 inch (7.5 cm) die, 40 mil (1 mm) die gap). Blown films were fabricated at a 315° F. (157° C.) melt temperature. Table Seven shows the fabrication conditions used for producing the blown films, as well as representative physical properties of the films.

TABLE SEVEN

| Description | Example 2 | Comparative Example A |
|---|---|---|
| Die Gap (mils (mm)) | 40 (1) | 40 (1) |
| Blow Up Ratio | 1.8 | 1.8 |
| Layflat (in (cm)) | 8.5 (22) | 8.5 (22) |
| Melt Temperature (° F. (° C.)) | 312 (156) | 317 (159) |
| Output Rate (lb/hr (kg/hr)) | 33 (15) | 33 (15) |
| Back Pressure (psi (MPa)) | 2758 ± 179 (19.01 ± 1.23) | 2112 ± 113 (14.56 ± 0.779) |
| Motor Load (amp) | 33 | 23 |
| Frost Line Height (in (cm)) | 7–8 (18–20) | 7–8 (18–20) |
| Gauge (mils (mm)) | 1.5 (0.038) | 1.5 (0.038) |
| 45 Degree Gloss (%) | 52.3 ± 1.7 | 70.6 ± 0.7 |
| Clarity (%) | 97.3 ± 0.1 | 92.2 ± 0.1 |
| Haze (%) | 11.9 ± 0.4 | 9.0 ± 0.2 |
| Dart Impact Type A | 54 | 66 |

Extruder Temperature Profiles; 300/300/300/300/300/300/300/300/300° F. (149/149/149/149/149/149/149/149/149° C.)

The Polymers of Comparative Examples D and E were fabricated into blown films on an Egan blown film line (2 inch (5 cm) extruder, 3 inch (7.5 cm) die, 40 mil (1 mm) die gap). Blown films were fabricated at 315° F. (157° C.) melt temperature. Table Eight shows the fabrication conditions used for producing the blown films, and representative properties of the blown films.

TABLE EIGHT

| Description | Comparative Example D | Comparative Example E | Comparative Example A |
|---|---|---|---|
| Die Gap (mils (mm)) | 40 (1) | 40 (1) | 40 (1) |
| Blow Up Ratio | 1.8 | 1.8 | 1.8 |
| Layflat (in (cm)) | 8.5 (22) | 8.5 (22) | 8.5 (22) |
| Melt Temperature (° F. (° C.)) | 315 (157) | 315 (157) | 311 (155) |
| Output Rate (lb/hr (kg/hr)) | 34 (15) | 34 (15) | 28 (13) |
| Back Pressure (psi (MPa)) | 2000–2100 (13.8–14.5) | 2000–2200 (13.8–15.2) | 2000–2100 (13.8–14.5) |
| Motor Load (amp) | 27 | 29 | 23 |
| Frost Line Height (in (cm)) | 6–6.5 (15–16.5) | 5.5–6 (14–15) | 4–5 (10–13) |
| Gauge (mils (mm)) | 1.5 (0.038) | 1.5 (0.038) | 1.5 (0.038) |
| Haze (%) | 37.5 ± 2.6 | 25.2 ± 1.7 | 9.2 ± 0.1 |
| Clarity (%) | 88.9 ± 1.2 | 90.4 ± 0.4 | — |

Extruder Temperature Profiles: 300/300/300/300/300/300/300/300/300° F. (149/149/149/149/149/149/149/149/149° C.)

The back pressures for the polymers of Comparative Examples C and D are similar to that of the polymer of Comparative Example A. The motor loads for the polymers of Comparative Examples C and D are higher than that of Comparative Example A (although the output rate was lower for the polymer of Comparative Example A, which will influence the motor load). Haze values for films prepared with the polymers of Comparative Examples C and D are significantly higher than that of a film prepared with Comparative Example A A concentrate of Irgafos 168 and Irganox 1010 was dry blended with the polymer of Example 3, such as to give 1200 ppm Irgafos 168 and 300 ppm Irganox 1010 in the polymer. Blown films were also prepared with slip and antiblock concentrate, such as top give 500 ppm erucamide slip agent and 2000 ppm White Mist antiblock in the polymer. The films were produced on an Egan blown film line (2 inch (5 cm) extruder, 3 inch (7.5 cm) die, 40 mil (1.0 mm) die gap). Blown films were fabricated at 315° F. (157° C.) melt temperature. Table Nine shows the fabrication conditions used for producing the blown films.

TABLE NINE

| Description | Example 3 + antioxidant | Example 3 + antioxidant + 10% LDPE 4012 | Example 3 + antioxidant +10% LDPE 4012 + Slip + Antiblock |
|---|---|---|---|
| Die Gap (mils (mm)) | 40 (1) | 40 (1) | 40 (1) |
| Blow Up Ratio | 1.8 | 1.8 | 1.8 |
| Layflat (in (cm)) | 8.5 (22) | 8.5 (22) | 8.5 (22) |
| Melt Temperature (° F. (° C.)) | 318 (159) | 310 (154) | 318 (159) |
| Output Rate (lb/hr (kg/hr)) | 30 (14) | 33 (15) | 30 (14) |
| Back Pressure (psi (MPa)) | 2000–2250 (13.8–15.5) | 2000–2200 (13.8–15.2) | 1900–2400 (13.1–16.5) |
| Motor Load (amp) | 22 | 21 | 23 |
| Frost Line Height (in (cm)) | 5 (13) | 6 (15) | 6 (15) |
| Gauge (mils (mm)) | 1.5–1.6 | 1.5 | 1.5–1.6 |

Extruder Temperature Profiles: 300/300/300/300/300/300/300/300/300° F. (149/149/149/149/149/149/149/149/149° C.)

Table Ten shows the optical and mechanical properties of films prepared with the polymer of Example 3, with various combinations of additives as described above. Table Ten illustrates the improvement on opticals which results from the incorporation of LDPE into the polymer, and the negative affect on opticals which results from the addition of slip and antiblock additives.

TABLE TEN

| Description | Example 3 + antioxidant | Example 3 + antioxidant + 10% LDPE 4012 | Example 3 + antioxidant + 10% LDPE 4012 + Slip + Antiblock |
|---|---|---|---|
| Haze (%) | 10.8 ± 0.7 | 9.3 ± 1.0 | 10.9 ± 0.6 |
| CD Elmendorf Tear (g) | NA | 225 ± 16 | 264 ± 44 |
| MD Elmendorf Tear (g) | NA | 91 ± 27 | 92 ± 37 |
| CD Elongation (%) | NA | 740 ± 43 | 690 ± 28 |
| MD Elongation (%) | NA | 520 ± 38 | 539 ± 36 |
| CD Tensile Strength (psi (MPa)) | NA — | 2893 ± 335 (19.94 ± 2.31) | 2559 ± 207 (17.64 ± 1.43) |
| MD Tensile Strength (psi (MPa)) | NA — | 3551 ± 300 (24.48 ± 2.07) | 3887 ± 352 (26.80 ± 2.42) |
| CD Toughness (ft-lb/in³ (J/cm³)) | NA — | 680 ± 104 (1.51 × 10⁴ ± 2300) | 576 ± 50 (1.28 × 10⁴ ± 1100) |
| MD Toughness (ft-lb/in³ (J/cm³)) | NA — | 627 ± 67 (1.39 × 10⁴ ± 1500) | 690 ± 76 (1.53 × 10⁴ ± 1700) |

¹AO package contains 1200 ppm Irgafos 168 and 300 ppm Irganox 1010
²Slip package contains 500 ppm Erucamide
³Antiblock package contains 2000 ppm White Mist As illustrated above, the polymers of Examples 1–3 exhibit mechanical properties which are improved over those of the Comparative Examples A and B, while not degrading optical performance to an unacceptable level. FIGS. 2 and 3 provide plots of $I_2$ versus $M_w$, and of $I_{10}/I_2$ versus $M_w/M_n$ for the polymers of Examples 1–3, as well as of polymers of the other examples and comparative examples. As set forth in FIG. 2, the polymers of Examples 1–3 will be characterized as satisfying the following inequality:

$$I_2 < 10^{(-3.525 \cdot Log(M_w))} + 17.84$$

Further, as set forth in FIG. 3, the polymers of Examples 1–3 will be characterized as satisfying the following inequality:

$$I_{10}/I_2 > [1.5 \cdot M_w/M_n] + 2.59$$

High Processing Polymers having a Fractional Melt Index

The polymers of Examples 1–5 were prepared with a constrained geometry catalyst in accordance with the procedures of U.S. Pat. Nos. 5,272,236 and 5,278,272. In each case, the catalyst employed t-butylamido)dimethyl)η⁵-tetramethylcyclopentadienyl)silanetitanium(II) 1,3-pentadiene catalyst, activated with trispentafluorophenylborane and triisopropylaluminum modified methylalumoxane (MMAO, available from Akzo Chemical). For instance, the polymer of Example 8 may be prepared utilizing the following process conditions:

| | |
|---|---|
| Solvent Feed (Kg/h) | 16.36 |
| Ethylene Feed (Kg/h) | 1.82 |
| Hydrogen Feed (SCCM) | 0 |
| Butene Feed (kg/h) | 0.155 |
| Ethylene Conv. % | 95.5 |
| Feed Temp (C.) | 15 |
| Reactor Temp (C.) | 132 |
| Catalyst Flow (kg/h) | |
| Primary | 2.39 × 10⁻⁶ |
| Co-catalyst Flow (kg/h) | 6.86 × 10⁻⁶ |
| Secondary Co-catalyst Flow (kg/h) | 1.14 × 10⁻⁵ |

The polymers of Comparative Examples A and B were commercially available low density polyethylene.

A description of the properties of the polymers of Examples 1–5, as well as the polymers of Comparative Examples A and B, as described above, are set forth in the following Table Eleven.

TABLE ELEVEN

| | Comparative Example A | Comparative Example B | Example 5 | Example 6 | Example 7 | Example 8 |
|---|---|---|---|---|---|---|
| Comonomer Type | — | — | Hexene | Hexene | Butene | Butene |
| $I_2$ (g/10 min) | 0.32 | 0.19 | 0.68 | 0.30 | 0.63 | 0.50 |
| $I_{10}/I_2$ | 13.4 | 20.7 | 13.3 | 16.1 | 14.4 | 13.7 |
| Density (g/cc) | 0.9217 | 0.919 | 0.9227 | 0.9205 | 0.9159 | 0.918 |
| Melting Temperature (° C.) | 111.98 | 108.55 | 114.06 | 113.57 | 107.89 | 110.5 |
| Crystallization Temperature (° C.) | 97.9 | 95.2 | 100.35 | 100.76 | 92.23 | 95.96 |
| Crystallinity (%) | 49.5 | 48.2 | 50.10 | 49.5 | 45.8 | 47.0 |
| Weight Average Molecular Weight (Mw) | 137900 | 166200 | 80700 | 89700 | 80200 | 82800 |
| Number Average Molecular Weight (Mn) | 22200 | 22100 | 32400 | 35800 | 33500 | 32500 |
| Mw/Mn | 6.211 | 7.520 | 2.490 | 2.505 | 2.394 | 2.547 |
| Haze | 13.5 | 19.7 | 9.9 | 7.3 | — | — |

Note: Density measured accordance with ASTM D-792
$I_2$ measured accordance with ASTM D-1238, Condition 190° C./2.16 Kg
$I_{10}$ measured accordance with ASTM D-1238, Condition 190° C./10 Kg
Haze measured accordance with ASTM D-1003

The polymers of Example 5 and of Comparative Examples A and B were fabricated into blown films. Blown films were fabricated at 320° F. (160° C.) melt temperature. Table Twelve shows the fabrication conditions used for producing the blown films, as well as the mechanical and optical properties of the resultant films.

TABLE TWELVE

| Description | Comparative Example A | Comparative Example B | Example 5 |
|---|---|---|---|
| Melt Temp. (° F. (° C.)) | 323 (162) | 319 (159) | 322 (161) |
| Back Pressure | 3727 ± 130 | 3747 ± 150 | 3811 ± 174 |
| (psi (MPa)) | (25.69 ± 0.90) | (25.8 ± 1.0) | (26.3 ± 1.2) |
| Motor Load (amps) | 40 | 38 | 45 |
| Output Rate | 37 (17) | 37 (17) | 38 (17) |
| (lb/hr (kg/hr)) | | | |
| Frost Line Height | 10.5 (26.7) | 10–10.5 | 8 (20) |
| (in (cm)) | | (25–26.7) | |
| Layflat (in (cm)) | 14 (36) | 14 (36) | 14 (36) |
| Gauge (mils (mm)) | 2.8–3.2 | 2.8–3.2 | 2.8–3.2 |
| | (0.07–0.08) | (0.07–0.08) | (0.07–0.08) |
| 45 Degree Gloss (%) | 46.1 ± 1.1 | 18.5 ± 0.6 | 62.5 ± 0.9 |
| Haze (%) | 16.1 ± 0.2 | 32.8 ± 0.3 | 10.1 ± 0.6 |
| Dart Impact Type A | 470 | 444 | 372 |
| CD Elmendorf Tear | 70 ± 14 | 42 ± 12 | 363 ± 24 |
| (g/mil) | | | |
| MD Elmendorf Tear | 39 ± 24 | 33 ± 21 | 157 ± 31 |
| (g/mil) | | | |
| CD Elongation (%) | 502 ± 12 | 443 ± 21 | 740 ± 12 |
| MD Elongation (%) | 340 ± 30 | 327 ± 42 | 690 ± 28 |
| CD Toughness | 918 ± 30 | 732 ± 50 | 1499 ± 72 |
| (ft-lb/in$^3$ (J/cm$^3$)) | (2.038 × 10$^4$ ± 670) | (1.625 × 10$^4$ ± 1100) | (3.328 × 10$^4$ ± 1600) |
| MD Toughness | 745 ± 88 | 725 ± 120 | 1531 ± 110 |
| (ft-lb/in$^3$ (J/cm$^3$)) | (1.654 × 10$^4$ ± 1900) | (1.610 × 10$^4$ ± 2700) | (3.399 × 10$^4$ ± 2400) |
| CD Tensiles | 3773 ± 78 | 3196 ± 137 | 4833 ± 235 |
| (psi (MPa)) | (26.01 ± 0.53) | (22.03 ± 0.94) | (33.3 ± 1.62) |
| MD Tensiles | 3355 ± 213 | 3263 ± 236 | 5057 ± 278 |
| (psi (MPa)) | (23.13 ± 1.47) | (22.50 ± 1.63) | (34.86 ± 1.92) |
| CD Shrinkage (%)** | 36.5 | 42.4 | 31.1 |
| MD Shrinkage (%)** | 71.5 | 73.4 | 53.2 |

Extruder Temperature Profile: 300/300/300/300/300/300/300/300/300° F. (149/149/149/149/149/149/149/149/149° C.
**CD and MD shrinkages were measured at 125° C., 20 seconds, 4 inch × 4 inch (10 cm × 10 cm) film sample Optical Properties of the films prepared with the polymers of Comparative Examples A and B differ. The film prepared with the polymer of Comparative Example A exhibits much better optical properties than that of the film prepared with the polymer of Comparative Example B. The film prepared with the polymer of Example 5 exhibited better optical properties, tensile (ultimate tensile strength and toughness), and Elmendorf tear values than the films of either of the polymers of Comparative Examples A or B. Bubble stability during processing was similar for each of the films prepared.

Optical properties are further improved by fabricating the films at a higher temperature. Blown films were fabricated at a melt temperature of 375° F. from the polymers of Comparative Examples A and B, and from the polymer of Examples 5 and 6. Table Thirteen sets forth the fabrication conditions used for producing the blown films, as well as the mechanical and optical properties of the resultant films.

TABLE THIRTEEN

| Description | Comparative Example A | Comparative Example B | Example 5 | Example 6 |
|---|---|---|---|---|
| Melt Temp. (° F. (° C.)) | 376 (191) | 379 (193) | 377 (192) | 400 (204) |
| Back Pressure | 3233 ± 139 | 3296 ± 129 | 3143 ± 150 | 3549 ± 167 |
| (psi (MPa)) | (22.28 ± 0.96) | (22.72 ± 0.89) | (21.67 ± 1.03) | (24.47 ± 1.15) |
| Motor Load (amps) | 34 | 33 | 39 | 44 |
| Output Rate | 37 (17) | 37 (17) | 39 (18) | 38 (17) |
| (lb/hr (kg/hr)) | | | | |
| Frost Line Height | 10.5 (26.7) | 10 (25) | 7 (18) | 7 (18) |
| (in (cm)) | | | | |
| Layflat (in (cm)) | 14 (36) | 14 (36) | 14 (36) | 14 (36) |
| Gauge (mils (mm)) | 2.8–3.2 | 2.8–3.2 | 2.8–3.2 | 2.8–3.2 |
| | (0.07–0.08) | (0.07–0.08) | (0.07–0.08) | (0.07–0.08) |
| 45 Degree Gloss (%) | 55.4 ± 1.7 | 33.2 ± 0.8 | 66.4 ± 2.4 | 72.1 ± 0.6 |
| Haze (%) | 13.5 ± 0.1 | 19.7 ± 0.2 | 9.9 ± 0.2 | 7.3 ± 0.5 |
| Dart Impact Type A | 428 | 366 | 346 | 374 |
| CD Elmendorf Tear | 101 ± 15 | 102 ± 72 | 254 ± 44 | 357 ± 29 |
| (g/mil) | | | | |
| MD Elmendorf Tear | 44 ± 22 | 44 ± 14 | 181 ± 44 | 177 ± 51 |
| (g/mil) | | | | |
| CD Elongation (%) | 538 ± 6 | 458 ± 45 | 666 ± 29 | 747 ± 23 |
| MD Elongation (%) | 423 ± 20 | 500 ± 31 | 651 ± 34 | 703 ± 30 |
| CD Toughness | 927 ± 22 | 877 ± 126 | 1267 ± 104 | 1712 ± 109 |

TABLE THIRTEEN-continued

| Description | Comparative Example A | Comparative Example B | Example 5 | Example 6 |
|---|---|---|---|---|
| (ft-lb/in³ (J/cm³)) | (2.058 × 10⁴ ± 4.90) | (1.947 × 10⁴ ± 2800) | (1.001 × 10⁴ ± 2300) | (3.801 × 10⁴ ± 24000) |
| MD Toughness | 943 ± 63 | 1000 ± 95 | 1345 ± 143 | 1662 ± 159 |
| ft-lb/in³ (J/cm³)) | (2.039 × 10⁴ ± 1400) | (2.093 × 10⁴ ± 1400) | (2.986 × 10⁴ ± 3200) | (3.690 × 10⁴ ± 3500) |
| CD Tensiles | 3613 ± 110 | 3921 ± 360 | 4552 ± 325 | 5958 ± 212 |
| (psi (MPa)) | (24.91 ± 0.76) | (27.04 ± 2.48) | (31.38 ± 2.24) | (41.07 ± 1.46) |
| MD Tensiles | 3715 ± 145 | 3478 ± 230 | 4725 ± 421 | 5839 ± 401 |
| (psi (MPa)) | (25.61 ± 1.0) | (23.98 ± 1.59) | (32.57 ± 2.90) | (40.25 ± 2.76) |
| CD Shrinkage (%)** | 35.0 | 39.0 | 28.1 | 32.1 |
| MD Shrinkage (%)** | 69.5 | 66.5 | 50.8 | 56.7 |

Extruder Temperature Profiles: 300/325/350/360/360/360/360/360/370/370° F. (149/163/177/182/182/182/182/182/188/188° C.)
**CD and MD Shrinkage were measured at 125° C., 20 seconds, 4 inch × 4 inch film sample A comparison of Tables Twelve and Thirteen illustrates that, in the case of the films prepared with the polymers of Comparative Examples A and B and with the polymer of Example 5, the films fabricated at higher melt temperature exhibited better optical properties (haze and gloss) than the films fabricated at lower melt temperature. Further, the films prepared with the polymers of Examples 5 and 6 exhibited better optical, tensile, and Elmendorf tear properties than the films fabricated with the polymers of Comparative Examples A and B. Bubble stability during processing was similar for the fabrication of each of the films.

High Processing Polymers Having a Melt Index of from 1 to 2 g/10 Minutes

The polymer of Example 9 is a substantially linear ethylene/1-octene interpolymer prepared in a single solution polymerization reactor, in accordance with the procedures of U.S. Pat. Nos. 5,272,236 and 5,278,272.

The polymer product of Polymer 9 may be produced in a solution polymerization process using a well-mixed recirculating loop reactor.

The ethylene and the hydrogen (as well as any ethylene an hydrogen which are recycled from the separator, are combined into one stream before being introduced into the diluent mixture, a mixture of $C_8$–$C_{10}$ saturated hydrocarbons, such as ISOPAR™-E (available from Exxon Chemical Company) and the comonomer, 1-octene.

The metal complex and cocatalysts are combined into a single stream and are also continuously injected into the reactor. The catalyst employed is (t-butylamido)dimethyl ($\eta^5$-tetramethylcyclopentadienyl)silanetitanium(IV) dimethyl, activated with trispentafluorophenylborane (available from Boulder Scientific as a 3 wt % solution in ISOPAR-E mixed hydrocarbon) and triisopropylaluminum modified methylalumoxane (MMAO Type 3A, available from Akzo Nobel Chemical Inc. as a solution in heptane having 2 wt % aluminum).

Sufficient residence time is allowed for the metal complex and cocatalyst to react prior to introduction into the polymerization reactor. The reactor pressure is held constant at about 475 psig.

After polymerization, the reactor exit stream is introduced into a separator where the molten polymer is separated from the unreacted comonomer(s), unreacted ethylene, unreacted hydrogen, and diluent mixture stream, which is in turn recycled for combination with fresh comonomer, ethylene, hydrogen, and diluent, for introduction into the reactor. The molten polymer is subsequently strand chopped or pelletized, and, after being cooled in a water bath or pelletizer, the solid pellets are collected. Table Fourteen describes the polymerization conditions and the resultant polymer properties

TABLE TWO

| | |
|---|---|
| Ethylene fresh feed rate (kg/hr) | 68 |
| Fresh octene feed rate (kg/hr) | 8.6 |
| Total octene concentration in recycle (weight %) (Estimated) | 5.3 |
| Fresh hydrogen feed rate (standard cm³/min) | about 400 |
| Solvent and octene feed race (kg/hr) | 227 |
| Ethylene conversion rate (wt %) | 96 |
| Reactor temperature (° C.) | 146 |
| Feed temperature (° C.) | 10 |
| Catalyst flow rate (kg/hr) | 0.91 |
| Primary cocatalyst to catalyst molar ratio (B:Ti) | 3.5 |
| Secondary cocatalyst to catalyst molar ratio (Al:Ti) | 5 |

Polymers such as those of Example 9 are targeted to replace HP-LDPE in optical grade film markets, such as clarity liner and bakery film. Performance requirements include: (1) the extruder processability and bubble stability similar to hightly branched low density polyethylene; (2) optics similar to clarity grade highly branched low density polyethylene; and (3) mechanical properties better than highly branched low density polyethylene.

Table Fifteen sets forth the properties of the Polymer of Example 9, as well as of the polymers of Comparative Examples F (LDPE 503, a highly branched low density polyethylene, available from The Dow Chemical Company)) and G (DOWLEX™ linear low density polyethylene (available from The Dow Chemical Company). Table Fifteen further reports performance attributes of these polymers and of blown films prepared from these polymers.

TABLE FIFTEEN

| | Comparative Example F | Example 9 | Comparative Example G |
|---|---|---|---|
| Melt Index, g/10 min. | 1.9 | 1.6 | 1.00 |
| $I_{10}/I_2$ | — | 13 | 8.0 |
| Melt Tension, g | 3.6 | 2.5 | 1.4 |
| Density, g/cc | 0.922 | 0.923 | 0.920 |
| Mechanical Properties: | | | |
| MD Elmendorf Tear, g | 414 | 287 | 691 |
| CD Elmendorf Tear, g | 310 | 729 | 819 |
| Dart Impact, g | 103 | 172 | 236 |
| Extrudability: | | | |
| Melt Temp., C. | 379 | 390 | 462 |

TABLE FIFTEEN-continued

|  | Comparative Example F | Example 9 | Comparative Example G |
|---|---|---|---|
| Extruder Pressure, psi (MPa) | 3390 (23.4) | 3950(27.2) | 5040(34.7) |
| Motor Amp. | 47 | 59 | 69 |
| Optics: |  |  |  |
| Haze, % | 5.6 | 4.6 | 12 |

As set forth in Table Fifteen, the polymer of Example 9 exhibits optical properties which exceed those of Comparative Example F, exhibit a processability and mechanical properties which are generally intermediate that of Comparative Examples F and G.

What is claimed is:

1. A film having at least one layer comprising a homogeneous interpolymer of ethylene and at least one comonomer selected from the group consisting of $C_3$–$C_{20}$ α-olefins, dienes, and cycloalkenes, wherein the interpolymer is characterized as having:
   a. a density of from 0.910 to 0.930 g/cm$^3$,
   b. a melt index ($I_2$) of less than 2.5 g/10 minutes,
   c. an $I_{10}/I_2$ of at least 10,
   d. a molecular weight distribution $M_w/M_n$ of from 2.1 to 5; and
the film having a haze of less than about 12% at a thickness of about 2.8 to 3.2 mils.

2. The film of claim 1, wherein the interpolymer is a substantially linear polymer characterized as having a molecular weight distribution, $M_w/M_n$, as determined by gel permeation chromatography and defined by the equation:

$$(M_w/M_n) < (I_{10}/I_2) - 4.63, \text{ and}$$

a gas extrusion rheology such that the critical shear rate at onset of surface melt fracture for the interpolymer is at least 50 percent greater than the critical shear rate at the onset of surface melt fracture for a linear ethylene polymer, wherein the interpolymer and the linear ethylene polymer comprise the same comonomer or comonomers, wherein the linear ethylene polymer has an $I_2$, $M_w/M_n$ and density within ten percent of the interpolymer, and wherein the respective critical shear rates of the interpolymer and the linear ethylene polymer are measured at the same melt temperature using a gas extrusion rheometer.

3. The film of claim 1, wherein the interpolymer has 0.01 to 3 long chain branches/1000 carbons.

4. The film of claim 1, wherein the interpolymer is characterized as having one to two crystallization peaks between 45° C. and 98° C., each of which has a CTBI of less than 18° C., as determined by TREF.

5. The film of claim 1, wherein the interpolymer is characterized as yielding a gel permeation chromatogram which exhibits two peaks.

6. The film of claim 5, wherein the interpolymer is prepared in two polymerization reactors, each of which contain a single site constrained geometry or metallocene catalyst.

7. The film of claim 6, wherein the interpolymer, upon fractionation by gel permeation chromatography, is characterized as comprising:
   a. from 25 to 90 percent of a first polymer fraction having a melt index ($I_2$) of from 0.05 to 1.0 g/10 minutes; and
   b. from 10 to 75 percent of a second polymer fraction having a melt index ($I_2$) of at least 30 g/10 minutes.

8. The film of claim 6, wherein the interpolymer is characterized as satisfying the following inequalities:
   a. $(I_2) < 10^{(-3.525 * Log(Mw) + 17.84)}$, and
   b. $I_{10}/I_2 > [1.5 * M_w/M_n] + 2.59$.

9. The film of claim 6, wherein the interpolymer, upon fractionation by gel permeation chromatography, is characterized as comprising:
   a. from 30 to 85 percent of a first polymer fraction having a melt index ($I_2$) of from 0.05 to 1.0 g/10 minutes; and
   b. from 15 to 70 percent of a second polymer fraction having a melt index ($I_2$) of at least 30 g/10 minutes.

10. The film of any of claims 1, 5, or 6, wherein the interpolymer is characterized as having two crystallization peaks between 45° C. and 98° C., each of which has a CTBI of less than 18° C., as determined by TREF.

11. The film of claim 2, wherein the interpolymer is further characterized as having:
   a. an ($I_2$) of less than 1 g/10 minutes,
   b. an $I_{10}/I_2$ of at least 12.5, and
   c. an $M_w/M_n$ of from 2.1 to 3.0.

12. The film of claim 2, wherein the interpolymer is further characterized as having a single crystallization peak between 45° C. and 98° C. having a CTBI of less than 18° C., as determined by TREF.

13. A process for preparing a blown film comprising:
   a. melting an interpolymer to a temperature of 300° F. to 350° F. (149° C. to 177° C.),
   b. extruding the polymer at the rate of 15 to 100 lb/hr (6.8 to 45 kg/hr) through a die having a 30 to 100 mil (0.76 to 2.5 mm) die gap,
   c. blowing the film to into a bubble, at a blow-up-ratio of 1.3:1 to 2.5:1, to form a 0.5 to 4 mil (0.01 to 0.1 mm) gauge film, and
   d. cooling the film by means external to the bubble,
wherein the interpolymer is an interpolymer of ethylene and at least one comonomer selected from the group consisting of $C_3$–$C_{20}$ α-olefins, dienes, and cycloalkenes is characterized as having:
   i. A density of from 0.910 to 0.930 g/cm$^3$,
   ii. A melt index ($I_2$) of less than 1 g/10 minutes,
   iii. an $I_{10}/I_2$ of at least 10,
   iv. a molecular weight distribution, $M_w/M_n$ of from 2.1 to 5; and
the film having a haze of less than about 12% at a thickness of about 2.8 to 3.2 mils.

14. A process for preparing a blown film comprising:
   a. melting an interpolymer to a temperature of 300° F. to 400° F. (149° C. to 204° C.),
   b. extruding the polymer at the rate of 15 to 100 lb/hr (6.8 to 45 kg/hr) through a die having a 30 to 100 mil (0.76 to 2.5 mm) die gap,
   c. blowing the film into a bubble, at a blow-up-ratio of 2:1 to 4:1, to form a 2 to 5 mil (0.05 to 0.1 mm) gauge film, and
   d. cooling the film by means external to the bubble,
wherein the interpolymer is an interpolymer of ethylene and at least one comonomer selected from the group consisting of $C_3$–$C_{20}$ α-olefins, dienes, and cycloalkenes is characterized as having:
   i. a density of from 0.910 to 0.930 g/cm$^3$,
   ii. a melt index ($I_2$) of from 0.05 to 2.5 g/10 minutes,
   iii. an $I_{10}/I_2$ of from 12.5 to 20,
   iv. a molecular weight distribution, $M_w/M_n$ of from 2.1 to 3; and the film having a haze of less than about 12% at a thickness of about 2.8 to 3.2 mils.

15. The process of either of claim 13 or 14, wherein the interpolymer is characterized as having one to two crystallization peaks between 45° C. and 98° C., each having a CTBI of less than 18° C., as determined by TREF.

16. A film having at least one layer comprising an interpolyrner of ethylene and at least one comomoner selected from the group consisting of $C_3$–$C_{20}$ α-olefins, dienes, and cycloalkenes, wherein the interpolymer is characterized as having:
   a. a density of from 0.910 to 0.930 g/cm³,
   b. a melt index ($I_2$) of less than 1 g/10 minutes,
   c. an $I_{10}/I_2$ of at least 10,
   d. a molecular weight distribution $M_w/M_n$ of from 2.1 to 5,
   e. a molecular weight distribution, $M_w/M_n$, as determined by gel permeation chromatography and defined by the equation:

$$(M_w/M_n) < (I_{10}/I_2) - 4.63,$$

f. a gas extrusion rheology such that the critical shear rate at onset of surface melt fracture for the interpolymer is at least 50 percent greater than the critical shear rate at the onset of surface melt fracture for a linear ethylene polymer, wherein the interpolymer and the linear ethylene polymer comprise the same comonomer or commoners, wherein the linear ethylene polymer has an $I_2$, $M_w/M_n$ and density within ten percent of the interpolymer, and wherein the respective critical shear rates of the interpolymer and the linear ethylene polymer are measured at the same melt temperature using a gas extrusion rheometer, and
   g. 0.01 to 3 long chain branches/1000 carbons; and
   the film having a haze of less than about 12% at a thickness of about 2.8 to 3.2 mils.

17. A film having at least one layer which is made from a blend of a thermoplastic polymer and an interpolymer of ethylene and at least one comomoner selected from the group consisting of $C_3$–$C_{20}$ α-olefins, dienes, and cycloalkenes, wherein the interpolymer is characterized as having:
   a. a density of from 0.910 to 0.930 g/cm³,
   b. a melt index ($I_2$) of from 0.2 to 10 g/10 minutes,
   c. an $I_{10}/I_2$ from 9 to 20,
   d. a molecular weight distribution $M_w/M_n$ of from 1.5 to 5, and
   e. a crystallization temperature breadth index of less than 180° C.;
   the thermoplastic polymer selected from the group consisting of low density polyethylene, linear low density polyethylene, high density polyethylene, ethylene vinyl acetate, ethylene vinyl alcohol, polypropylene, polycarbonate, ethylene/styrene interpolymers, and mixtures thereof; and
   the film having a haze of less than about 12% at a thickness of about 2.8 to 3.2 mils.

18. The film of claim 17 wherein the thermoplastic polymer includes low density polyethylene.

19. The film of claim 18 wherein the interpolymer is characterized as having:
   a. a melt index ($I_2$) of less than 1 g/10 minutes, and
   b. 0.01 to 3 long chain branches/1000 carbons.

20. The film of claim 17 wherein the interpolymer is a substantially linear polymer characterized as having
   a molecular weight distribution, $M_w/M_n$, as determined by gel permeation chromatography and defined by the equation:

$$(M_w/M_n) < (I_{10}/I_2) - 4.63, \text{ and}$$

a gas extrusion rheology such that the critical shear rate at onset of surface melt fracture for the interpolymer is at least 50 percent greater than the critical shear rate at the onset of surface melt fracture for a linear ethylene polymer, wherein the interpolymer and the linear ethylene polymer comprise the same comonomer or commoners, wherein the linear ethylene polymer has an $I_2$, $M_w/M_n$ and density within ten percent of the interpolymer, and wherein the respective critical shear rates of the interpolymer and the linear ethylene polymer are measured at the same melt temperature using a gas extrusion rheometer; and
   a molecular weight distribution of 1.5 to 3.5.

21. A process for preparing a blown film comprising:
   a. melting an interpolymer to a temperature of 300° F. to 400° F. (149° C. to 204° C.),
   b. extruding the polymer at the rate of 15 to 100 lb/hr (6.8 to 45 kg/hr) through a die having a 30 to 100 mil (0.76 to 2.5 mm) die gap,
   c. blowing the film to into a bubble, at a blow-u-ratio of 2:1 to 4:1, to form a 2 to 5 mil (0.05 to 0.1 mm) gauge film, and
   d. cooling the film by means external to the bubble,
   wherein the interpolymer is an interpolymer of ethylene and at least one comomoner selected from the group consisting of and $C_3$–$C_{20}$ α-olefins, dienes, and cycloalkenes is characterized as having:
   a. a density of from 0.910 to 0.930 g/cm³,
   b. a melt index ($I_2$) of less than 1 g/10 minutes,
   c. an $I_{10}/I_2$ of at least 10,
   d. a molecular weight distribution $M_w/M_n$ of from 2.1 to 5,
   e. a molecular weight distribution, $M_w/M_n$, as determined by gel permeation chromatography and defined by the equation:

$$(M_w/M_n) < (I_{10}/I_2) - 4.63,$$

f. a gas extrusion rheology such that the critical shear rate at onset of surface melt fracture for the interpolymer is at least 50 percent greater than the critical shear rate at the onset of surface melt fracture for a linear ethylene polymer, wherein the interpolymer and the linear ethylene polymer comprise the same comonomer or commoners, wherein the linear ethylene polymer has an $I_2$, $M_w/M_n$ and density within ten percent of the interpolymer, and wherein the respective critical shear rates of the interpolymer and the linear ethylene polymer are measured at the same melt temperature using & gas extrusion rheometer, and
   g. 0.01 to 3 long chain branches/1000 carbons; and
   the film having a haze of less than about 12% at a thickness of about 2.8 to 3.2 mils.

22. The process of claim 21 wherein the interpolymer has a molecular weight distribution of 2.1 to 3.0.

23. A film having at least one layer comprising a homogeneous interpolymer of ethylene and at least one comonomer selected from the group consisting of $C_3$–$C_{20}$ α-olefins, dienes, and cycloalkenes, wherein the interpolymer is characterized as having:

a. a density of from 0.910 to 0.930 g/cm$^3$,
 b. a melt index ($I_2$) of less than 1 g/10 minutes,
 c. an $I_{10}/I_2$ of at least 10,
 d. a molecular weight distribution $M_w/M_n$ of from 2.1 to 5; and the film having a haze of less than about 12% at a thickness of about 2.8 to 3.2 mils.

24. The film of claim 23 wherein the interpolymer is characterized as satisfying the following inequalities:

a. $(I_2)<10^{(-3.525*\,Log(Mw)+17.84)}$, and
 b. $I_{10}/I_2>[1.5*M_w/M_n]+2.59$.

25. The film of claim 24, wherein the interpolymer has 0.01 to 3 long chain branches/1000 carbons.

26. The film of claim 25, wherein the interpolymer is characterized as yielding a gel permeation chromatogram which exhibits two peaks.

27. The film of claim 26 wherein the film includes low density polyethylene.

28. A film having at least one layer comprising a homogeneous interpolymer of ethylene and at least one comomoner selected from the group consisting of $C_4$–$C_{20}$ α-olefins, dienes, and cycloalkenes, wherein the interpolymer is characterized as having:

a. a density of from 0.910 to 0.930 g/cm$^3$,
 b. a melt index ($I_2$) of less than 2.5 g/10 minutes,
 c. an $I_{10}/I_2$ of at least 10,
 d. a molecular weight distribution $M_w/M_n$ of from 2.1 to 5; and the film having a haze of less than about 12% at a thickness of about 2.8 to 3.2 mils.

29. The film of claim 28, wherein the interpolymer has 0.01 to 3 long chain branches/1000 carbons.

30. The film of claim 29, wherein the interpolymer is characterized as having one to two crystallization peaks between 45° C. and 98° C., each of which has a CTBI of less than 18° C., as determined by TREF.

31. The film of claim 30, wherein the interpolymer is characterized as satisfying the following inequalities:

a. $(I_2)<10^{(-3.525*\,Log(Mw)+17.84)}$, and
 b. $I_{10}/I_2>[1.5*M_w/M_n]+2.59$.

32. A film having at least one layer comprising a homogeneous interpolymer of ethylene and at least one comomoner selected from the group consisting of $C_4$–$C_{20}$ α-olefins, dienes, and cycloalkenes, wherein the interpolymer is made with a single catalyst and is characterized as having:

a. a density of from 0.910 to 0.930 g/cm$^3$,
 b. a melt index ($I_2$) of less than 2.5 g/10 minutes,
 c. an $I_{10}/I_2$ of at least 10,
 d. a molecular weight distribution $M_w/M_n$ of from 2.1 to 5; and the film having a haze of less than about 12% at a thickness of about 2.8 to 3.2 mils.

* * * * *

UNITED STATES PATENT AND TRADEMARK OFFICE
CERTIFICATE OF CORRECTION

PATENT NO. : 6,982,311 B2
APPLICATION NO. : 10/210139
DATED : January 3, 2006
INVENTOR(S) : Seema V. Karande et al.

It is certified that error appears in the above-identified patent and that said Letters Patent is hereby corrected as shown below:

Column 35, line 8, delete "interpolyrner" and insert --interpolymer-- therefor.

Column 35, line 52, delete "180°C." and insert --18°C.-- therefor.

Column 36, line 58, delete "&" and insert --a-- therefor.

Signed and Sealed this

Twenty-fourth Day of July, 2007

JON W. DUDAS
*Director of the United States Patent and Trademark Office*